(12) United States Patent
Liu et al.

(10) Patent No.: US 10,429,572 B2
(45) Date of Patent: Oct. 1, 2019

(54) LIGHT SOURCE MODULE AND DISPLAY DEVICE

(71) Applicant: Coretronic Corporation, Hsin-Chu (TW)

(72) Inventors: Chin-Ku Liu, Hsin-Chu (TW); Ching-Hsiang Li, Hsin-Chu (TW); Chien-Hui Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 120 days.

(21) Appl. No.: 15/470,931

(22) Filed: Mar. 28, 2017

(65) Prior Publication Data

US 2017/0329073 A1 Nov. 16, 2017

(30) Foreign Application Priority Data

May 12, 2016 (TW) .............................. 105114673 A

(51) Int. Cl.
*G02F 1/1335* (2006.01)
*G02F 1/13* (2006.01)
*F21V 8/00* (2006.01)

(52) U.S. Cl.
CPC ......... *G02B 6/0053* (2013.01); *G02B 6/0051* (2013.01); *G02B 6/0056* (2013.01);
(Continued)

(58) Field of Classification Search
CPC .. G02B 6/0053; G02B 6/0076; G02B 6/0068; G02B 6/0051; G02F 1/133528; G02F 1/1323; G02F 2001/13362
See application file for complete search history.

(56) References Cited

U.S. PATENT DOCUMENTS

| 6,222,689 B1 | 4/2001 | Higuchi et al. |
| 2007/0076434 A1 | 4/2007 | Uehara et al. |

(Continued)

FOREIGN PATENT DOCUMENTS

| EP | 3173859 | 5/2017 |
| TW | 201202799 | 1/2012 |

(Continued)

OTHER PUBLICATIONS

"Search Report of Europe Counterpart Application", dated Oct. 9, 2017, p. 1-p. 6, in which the listed references were cited.

*Primary Examiner* — Michael H Caley
*Assistant Examiner* — Mariam Qureshi
(74) *Attorney, Agent, or Firm* — JCIPRNET

(57) ABSTRACT

A light source module including a first backlight module, a second backlight module, a turning film, and a first absorptive polarizer film is provided. The first backlight module has a first side and a second side. The first backlight module includes a first light guide plate (LGP) having a first light incident surface and a first light source disposed beside the first light incident surface. The second backlight module is arranged at the second side. The second backlight module includes a second LGP having a second light incident surface and a second light source disposed beside the second light incident surface. The turning film is arranged at the first side. The turning film includes a plurality of reverse prisms. The reverse prisms extend along an extension direction. The first absorptive polarizer film is disposed between the first backlight module and the second backlight module. A display device is also provided.

15 Claims, 21 Drawing Sheets

(52) U.S. Cl.
CPC ......... *G02B 6/0068* (2013.01); *G02B 6/0076* (2013.01); *G02F 1/1323* (2013.01); *G02F 1/133528* (2013.01); *G02F 1/133615* (2013.01); *G02F 1/13362* (2013.01); *G02F 2001/133538* (2013.01); *G02F 2001/133626* (2013.01)

(56) References Cited

U.S. PATENT DOCUMENTS

| | | | |
|---|---|---|---|
| 2009/0067156 A1 | 3/2009 | Bonnett et al. | |
| 2012/0235891 A1* | 9/2012 | Nishitani | G02B 3/0056 345/102 |
| 2014/0036529 A1* | 2/2014 | Suzuki | G02B 6/0053 362/606 |
| 2014/0146271 A1* | 5/2014 | Hung | G02B 6/0011 349/62 |
| 2015/0301384 A1* | 10/2015 | Koike | G02F 1/1336 349/65 |
| 2016/0178834 A1* | 6/2016 | Yu | G02B 6/0076 362/19 |

FOREIGN PATENT DOCUMENTS

| | | |
|---|---|---|
| TW | 201232122 | 8/2012 |
| TW | 201421125 | 6/2014 |
| TW | I504988 | 10/2015 |

\* cited by examiner ial no. 105114673, filed on May 12, 2016.
LIGHT SOURCE MODULE AND DISPLAY DEVICE

CROSS-REFERENCE TO RELATED APPLICATION

This application claims the priority benefit of Taiwan application serial no. 105114673, filed on May 12, 2016. The entirety of the above-mentioned patent application is hereby incorporated by reference herein and made a part of this specification.

FIELD OF THE INVENTION

The invention relates to a light source module and a display device.

DESCRIPTION OF RELATED ART

With the rapid development of science and technologies, liquid crystal displays (LCDs) have been applied extensively to various technical fields. The LCDs can be categorized into wide-view-angle LCDs and narrow-view-angle LCDs according to the difference in the view angles. When the wide-view-angle LCD is applied, multiple people can observe the images together, which can satisfy the need of sharing the images in a household. By contrast, the narrow-view-angle LCD can meet the requirement for privacy and is applicable to notebooks that may be used in public. To comply with both the need of sharing the images with multiple people and the requirement for processing confidential data in public, the LCD with switchable view angles (between the wide view angle and the narrow view angle) has become one of the mainstream products in the LCD market.

However, generally speaking, during the switching process, the luminance, the image contrast, or the image quality of the LCD with the switchable view angles is often compromised. In addition, the optical efficiency of the conventional LCDs is not satisfactory. Therefore, how to overcome said problems has become the main task of researchers in the pertinent field.

The information disclosed in this "Description of Related Art" section is only for enhancement of understanding of the background of the invention and therefore it may contain information that does not form the prior art that is already known to a person of ordinary skill in the art. Furthermore, the information disclosed in this "Description of Related Art" section does not mean that one or more problems to be resolved by one or more embodiments of the invention were acknowledged by a person of ordinary skill in the art.

SUMMARY OF THE INVENTION

The invention is directed to a light source module with the favorable light emitting quality.

The invention is directed to a display device having said light source module with the favorable image quality.

Other objectives and advantages of the invention can be further illustrated by the technical features broadly embodied and described as follows.

In order to achieve one or a part of or all of the above advantages or other advantages, an embodiment of the invention provides a light source module that includes a first backlight module, a second backlight module, a first turning film, and a first absorptive polarizer film. The first backlight module has a first side and a second side opposite to each other. The first backlight module includes a first light guide plate (LGP) and a first light source. The first LGP has a first light incident surface. The first light source is disposed beside the first light incident surface. The second backlight module is disposed at the second side of the first backlight module. The second backlight module includes a second LGP and a second light source. The second LGP has a second light incident surface. The second light source is disposed beside the second light incident surface. The first turning film is disposed at the first side of the first backlight module. The first turning film includes a plurality of reverse prisms. The reverse prisms extend along an extension direction. The first absorptive polarizer film is disposed between the first backlight module and the second backlight module. The first absorptive polarizer film has a first polarizing transmission axis.

In order to achieve one or a portion of or all of the objects or other objects, one embodiment of the invention provides a display device including said light source module and a display panel. The display panel includes a first polarizer film, a second polarizer film, and a liquid crystal layer. The liquid crystal layer is disposed between the first polarizer film and the second polarizer film. The second polarizer film is disposed between the liquid crystal layer and the first turning film of the light source module. The second polarizer film has a second polarizing transmission axis. An included angle between an axial direction of the first polarizing transmission axis and an axial direction of the second polarizing transmission axis substantially falls within a range from 0 degree to 60 degrees.

In view of the above, the display device and the light source module in the embodiments of the invention provided herein may achieve at least one of advantages or effects as listed below. The design of the display device provided in an embodiment of the invention allows the included angle between the axial direction of the first polarizing transmission axis of the first absorptive polarizer film and the axial direction of the second polarizing transmission axis of the second polarizer film in the display panel to substantially fall within the range from 0 degree to 60 degrees. Hence, in different view angle display modes (e.g., the narrow-view-angle display mode or the wide-view-angle display mode), the light emitting efficacy of the light source module provided herein is relatively unlikely to be affected by stray light, and thus the favorable light emitting quality can be guaranteed. Since the display device provided in the embodiments of the invention includes said light source module, the display device in different view angle display modes can have the favorable image quality.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6A is a schematic cross-sectional view illustrating a display device according to another embodiment of the invention.

FIG. 6B is an explosive view illustrating the display device depicted in FIG. 6A.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
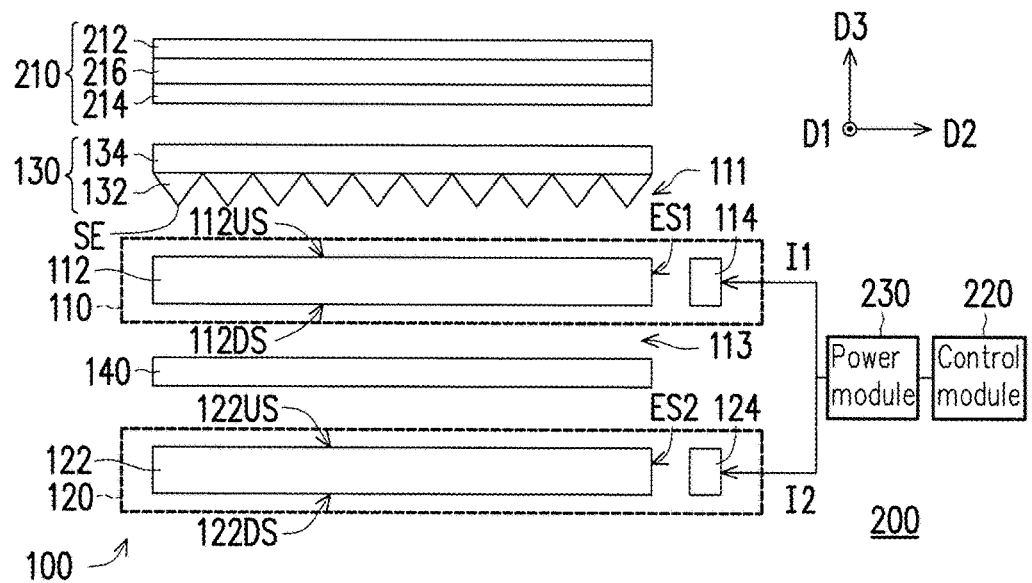
FIG. 1A is a schematic cross-sectional view illustrating a display device according to an embodiment of the invention.
Figure 1B:
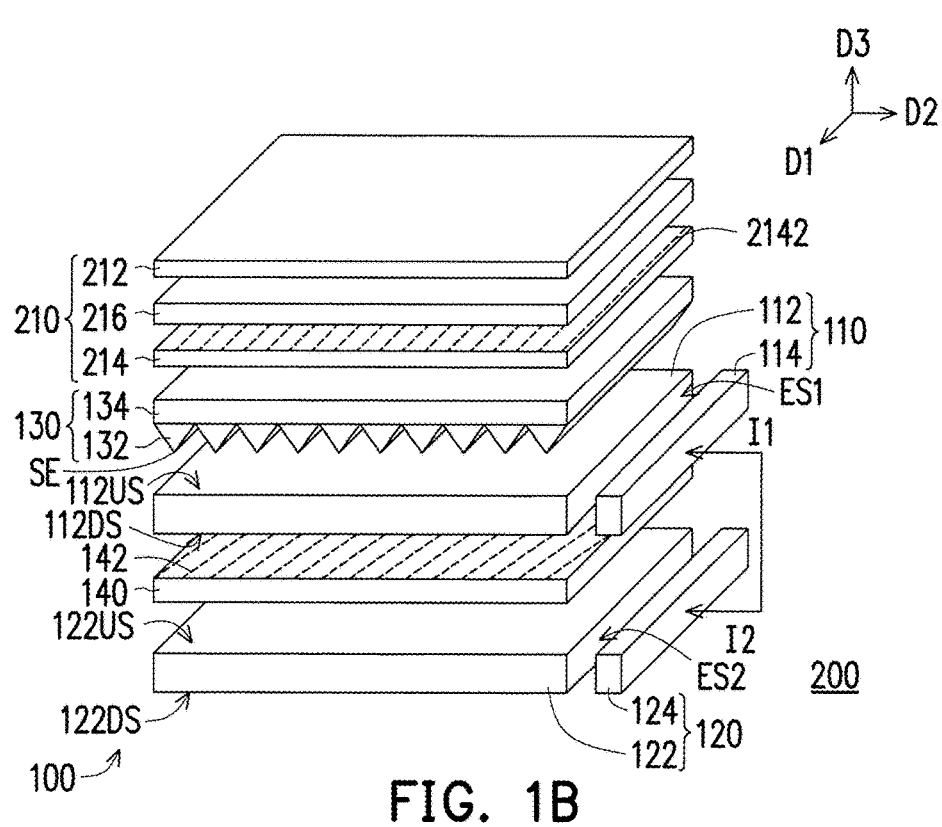
FIG. 1B is an explosive view illustrating the display device depicted in FIG. 1A.

FIG. 1A is a schematic cross-sectional view illustrating a display device according to an embodiment of the invention. FIG. 1B is an explosive view illustrating the display device depicted in FIG. 1A.

To elaborate the arrangement in the display device 200, the display device 200 provided in the present embodiment may be deemed as being located in a space constructed by a first direction D1, a second direction D2, and a third direction D3. The first direction D1 is, for instance, substantially perpendicular to the second direction D2. The third direction D3 is, for instance, substantially perpendicular to both the first direction D1 and the second direction D2. In the present embodiment, the direction D1 is a vertical direction along which users observe images on the display device, for instance. The second direction D2 is a horizontal direction along which users observe images on the display device, for instance. The third direction D3 is a normal direction along which users observe images on the display device, and the third direction D3 is perpendicular to the display surface, for instance.

With reference to FIG. 1A and FIG. 1B, in the present embodiment, a display device 200 includes a light source module 100 and a display panel 210. The light source module 100 includes a first backlight module 110, a second backlight module 120, a first turning film 130, and a first absorptive polarizer film 140. The arrangement of each element in the light source module 100 and the display panel 210 will be elaborated below.

In the present embodiment, the display panel 210 is, for instance, an LCD. In some embodiments of the invention, the display panel 210 is, for instance, a reflective display panel or a transmissive display panel, while the invention is not limited thereto. Particularly, the display panel 210 includes a first polarizer film 212, a second polarizer film 214, and a liquid crystal layer 216. The liquid crystal layer 216 is disposed between the first polarizer film 212 and the second polarizer film 214. The liquid crystal layer 216 is sandwiched between the first polarizer film 212 and the second polarizer film 214. The second polarizer film 214 is disposed between the liquid crystal layer 216 and the first turning film 130 of the light source module 100. The second polarizer film 214 has a second polarizing transmission axis 2142. In the present embodiment, teachings and suggestions of the way to operate and implement the display panel 210 should be known to people in the pertinent field and hence will not be further provided.

The first backlight module 110 has a first side 111 and a second side 113 opposite to each other. The first backlight module 110 includes a first Light Guide Plate (LGP) 112 and a first light source 114. The first LGP 112 has a first light incident surface ES1. The first light source 114 is disposed beside the first light incident surface ES1. The first light source 114 is, for instance, a light emitting diode (LED), an organic LED, a code cathode fluorescent lamp (CCFL), a hot cathode fluorescent lamp (HCFL), or any other appropriate light emitting device, which should however not be construed as a limitation to the invention.

The second backlight module 120 is disposed at the second side 113 of the first backlight module 110. The second backlight module 120 includes a second LGP 122 and a second light source 124. The second LGP 122 has a second light incident surface ES2. The second light source 124 is disposed beside the second light incident surface ES2. The second light source 124 is, for instance, an LED, an organic LED, a CCFL, an HCFL, or any other appropriate light emitting device, which should however not be construed as a limitation to the invention.

The first turning film 130 is located at the first side 111 of the first backlight module 110. The first turning film 130 includes a plurality of reverse prisms 132 and a transparent substrate 134. The reverse prisms 132 are located on the transparent substrate 134, and an end SE of each reverse prism 132 faces toward the first LGP 110. The reverse prisms 132 are arranged in the second direction D2 and extended in the first direction D1, for instance. The extension direction of the reverse prisms 132 of the first turning film 130 is substantially parallel to the axial direction of the second polarizing transmission axis 2142. When an incident light enters the first turning film 130 at a relative small angle to a normal direction of a lower surface of the first turning film 130, it should be mentioned that the incident light exits from an upper surface of the first turning film 130 at a relative large angle to the normal direction of the upper surface of the first turning film 130. When the incident light enters the first turning film 130 at a relative large angle to the normal direction of the lower surface of the first turning film 130, it should be mentioned that the incident light exits from an upper surface of the first turning film 130 approximately in the normal direction of the upper surface.

The first absorptive polarizer film 40 is located between the first backlight module 110 and the second backlight module 120. The first absorptive polarizer film 140 has a first polarizing transmission axis 142. Note that the first absorptive polarizer film 140 provided in the present embodiment absorbs one portion of light with a specific linear polarization direction that is substantially parallel to an absorption axis (not shown) of the first absorptive polarizer film 140. By contrast, the first absorptive polarizer film 140 allows the other portion of light with another specific linear polarization direction to pass through, and the another specific linear polarization direction is substantially parallel to the first polarizing transmission axis 142.

With reference to FIG. 1B, in the present embodiment, an included angle between the axial direction of the first polarizing transmission axis 142 and the axial direction of the second polarizing transmission axis 2142 substantially falls within a range from 0 degree to 60 degrees.

According to the present embodiment, the display device 200 further includes a control module 220 and a power module 230. The control module 220 is, for instance, a controller, which should however not be construed as a limitation to the invention. The power module 230 is, for instance, a battery module, which should however not be construed as a limitation to the invention. The control module 220 is coupled to the power module 230. The power module 230 is coupled to the first light source 114 of the first backlight module 110 and the second light source 124 of the second backlight module 120. The power module 230 is configured to provide the first light source 114 with a first driving current I1 and the second light source 124 with a second driving current I2. The control module 220 is configured to control at least one of the first driving current I1 and the second driving current I2. In the present embodiment, the control module 220 is configured to control both the first driving current I1 and the second driving current I2.

The display device 200 provided in the present embodiment controls the power module 230 through the control module 220, such that the power module 230 provides the driving current to the first light source 114 or the second light source 124, and that the corresponding backlight module can emit light. In the present embodiment, the minimum current value that enables the first light source 114 to emit light is the first threshold value, and the minimum current value that enables the second light source 124 to emit light is the second threshold value. For instance, if it is intended to enable the first backlight module 110 to emit light but not to enable the second backlight module 120 to emit light, the control module 220 drives the power module 230 to provide the first driving current I1 whose value is greater than the first threshold value and drives the power module 230 to provide the second driving current I2 whose value is less than the second threshold value. By contrast, if it is intended not to enable the first backlight module 110 to emit light but to enable the second backlight module 120 to emit light, the control module 220 drives the power module 230 to provide the first driving current I1 whose value is less than the first threshold value and drives the power module 230 to provide the second driving current I2 whose value is greater than the second threshold value. Similarly, if it is intended to enable the first backlight module 110 to emit light and enable the second backlight module 120 to emit light, the control module 220 drives the power module 230 to provide the first driving current I1 whose value is greater than the first threshold value and drives the power module 230 to provide the second driving current I2 whose value is greater than the second threshold value. In brief, through switching the light sources in the two backlight modules, the display device 200 provided herein is able to perform the function of switching between the narrow-view-angle display mode and the wide-view-angle display mode.

Figure 2A:
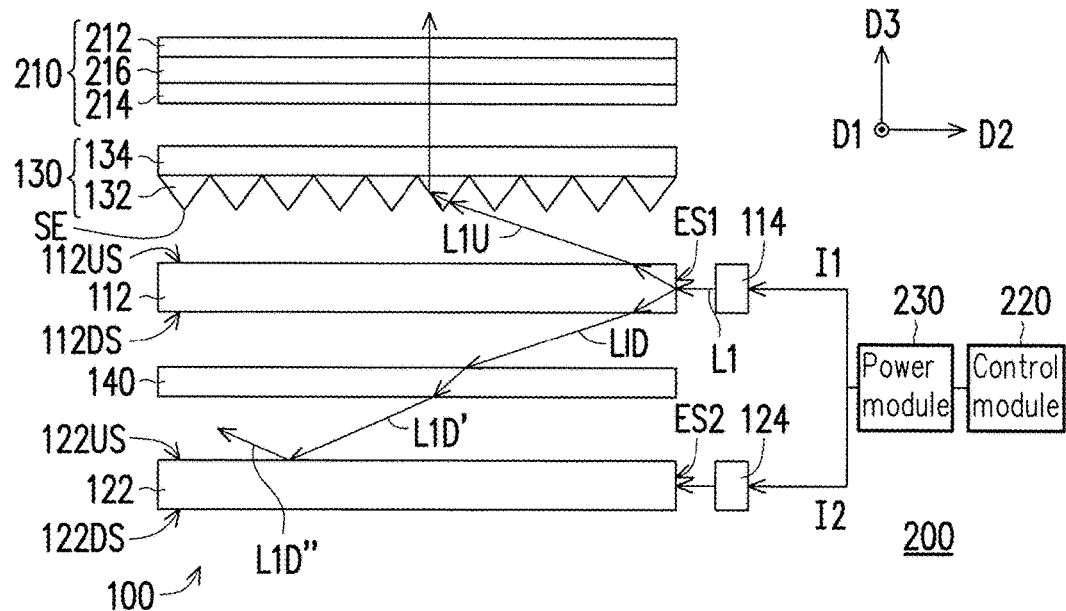
FIG. 2A and FIG. 2B are schematic views illustrating a light path in different view angle display modes according to the embodiment shown in FIG. 1A and FIG. 1B.
Figure 2B:
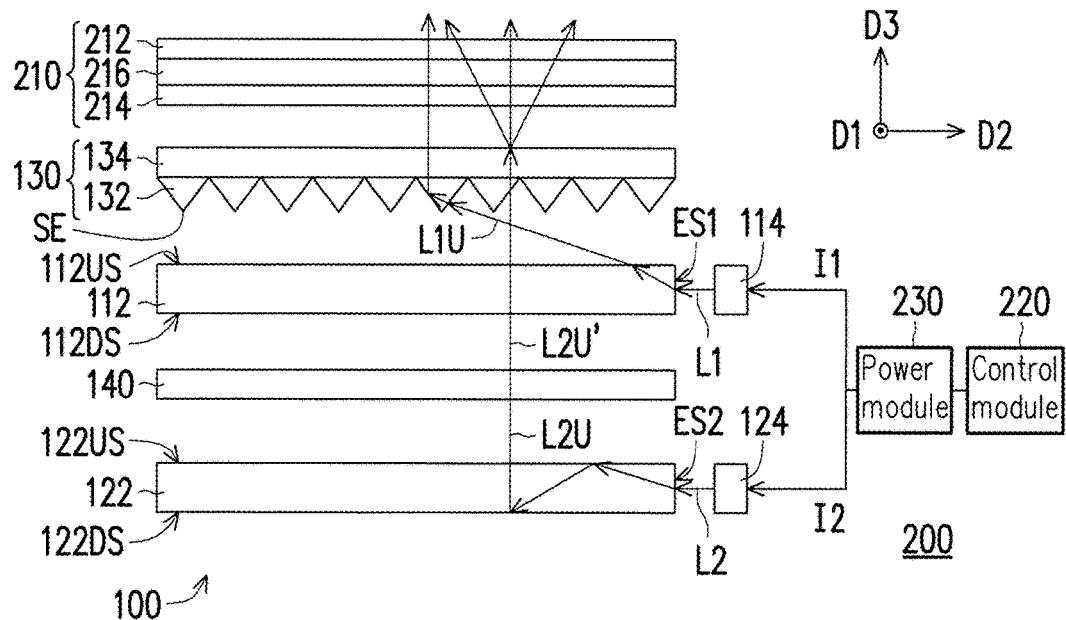

FIG. 2A and FIG. 2B are schematic views illustrating a light path in different view angle display modes according to the embodiment shown in FIG. 1A and FIG. 1B.

In the present embodiment, the light paths in different view angle display modes will be elaborated hereinafter. Please refer to FIG. 2A which schematically illustrates a light path of the display device 200 in the narrow-view-angle display mode according to the present embodiment. Specifically, in the present embodiment, the control module 220 controls the value of the first driving current I1 to be greater than the first threshold value and controls the value of the second driving current I2 to be less than the second threshold value. Namely, as shown in FIG. 2A, the first light source 114 of the first backlight module 110 emits light, but the second light source 124 of the second backlight module 120 does not emit light. According to the present embodiment, the first light source 114 provides a first light L1. The first light L1 enters the first LGP 112 through the first light incident surface ES1. A direction in which the first light L1 enters the first LGP 112 is an opposite direction of the second direction D2, for instance.

With reference to FIG. 2A, in the present embodiment, the first light L1 is emitted through an upper surface 112US or a lower surface 112DS of the first LGP 112. In general, a portion of the first light L1 (i.e., the first light L1U) exiting from the upper surface 112US enters the first turning film 130 at a relative large angle in the normal direction of the lower surface of the first turning film 130, and thus the first light L1U is emitted from the first turning film 130 in a manner similar to the normal light emission. Thereby, in the second direction D2 (i.e., the horizontal direction), the optical effects achieved by the display device 200 are the narrow-view-angle optical effects, i.e., the narrow-view-angle display mode, for instance. On the other hand, the other portion of the first light L1 (i.e., the first light L1D) exiting from the lower surface 112DS of the first LGP 112 enters the first absorptive polarizer film 140. When the first light L1D passes through the first absorptive polarizer film 140, parts of the first light L1D with the polarization direction different from the axial direction of the first polarizing transmission axis 140 are filtered out and absorbed by the first absorptive polarizer film 140. The other parts of the first light L1D (i.e., the first light L1D') with the polarization direction substantially parallel to the axial direction of the first polarizing transmission axis 140 pass through the first absorptive polarizer film 140. That is, the first light L1D' have the polarization direction substantially parallel to the axial direction of the first polarizing transmission axis 140. After the first light L1D' enter the second backlight module 120, the first light L1D' are partially reflected back to the first absorptive polarizer film 140 (i.e., the first light L1D"), and the first light L1D" have a different polarization direction to the first light L1D'. In the first light L1D", some of the first light L1D" having the polarization direction substantially parallel to the axial direction of the first polarizing transmission axis 140 again pass through the first absorptive polarizer film 140, and the others (i.e., L1D") are again absorbed by the first absorptive polarizer film 140.

Accordingly, the first light L1D exiting from the lower surface 112DS of the first LGP 112 is barely reflected back to the first backlight module 110. Although some of the first light (i.e., L1D") again pass through the first absorptive polarizer film 140, when they pass through the first turning film 130 and enter the second polarizer film 214 of the display panel 210, the stray light of the first light (i.e., L1D") with the polarization direction different from the axial direction of the second polarizing transmission axis 2142 can be further filtered out due to the design of the substantial parallel axial directions of the first and second polarizing transmission axes 142 and 2142. In the present embodiment, the axial direction of the first polarizing transmission axis 142 is substantially parallel to the axial direction of the second polarizing transmission axis 2142; however, people having ordinary skill in the pertinent art can also filter out the stray light through adjusting the included angle between the axial direction of the first polarizing transmission axis 142 and the axial direction of the second polarizing transmission axis 2142 based on actual needs. Here, the included angle between the axial direction of the first polarizing transmission axis 142 of the first absorptive polarizer film 140 and the axial direction of the second polarizing transmission axis 2142 of the second polarizer film 214 substantially falls within the range from 0 degree to 60 degrees, and the design of the included angle within said range ensures that the stray light can be filtered out. In light of the foregoing, in the narrow-view-angle display mode, the emitted light of the display device 200 provided herein is mainly the first light L1U exiting from the upper surface 112US of the first LGP 112, and the stray light reflected from the bottom of the first backlight module 110 is relatively negligible; therefore, the display device 200 provided herein can be characterized by favorable image quality.

Please refer to FIG. 2B which schematically illustrates a light path of the display device 200 in the wide-view-angle display mode according to the present embodiment. Specifically, in the present embodiment, the control module 220 controls the value of the first driving current I1 to be greater than the first threshold value and controls the value of the second driving current I2 to be greater than the second threshold value. That is, in FIG. 2B, the first light source 114 and the second light source 124 can respectively emit the first light L1 and the second light L2. The optical effects of the first light L1 are already given above and thus will not be further provided below. Hence, similarly, in the wide-view-display mode, the display device 200 provided herein can display images with favorable quality. The optical effects of the second light L2 are elaborated hereinafter. According to the present embodiment, the second light source 124 provides a second light L2. The second light L2 enters the second LGP 122 through the second light incident surface ES2. A direction in which the second light L2 enters the second LGP 122 is an opposite direction of the second direction D2, for instance.

In the present embodiment, one portion of the second light L2 (i.e., the second light L2U) exits from the upper surface 122US of the second LGP 122. When the second light L2U enters the first absorptive polarizer film 140, parts of the portion of the second light L2U (i.e., the second light L2U') with the polarization direction substantially parallel to the axial direction of the first polarizing transmission axis 142 pass through the first absorptive polarizer film 140. The second light L2U' pass through the first LGP 112 and enter the first turning film 130 at a relative small angle to the normal direction of the lower surface of the first turning film 130, and thus the second light L2U', after passing through the first turning film 130, are emitted from the first turning film 130 at a relatively large angle to the normal direction of the upper surface of the first turning film 130. As discussed above, the light path of the second light L2U' entering the first turning film 130 at a relative small angle; however, if the light path of the second light L2U in the second LGP 122 is changed by the structure of the second LGP 122 or by printed ink (not shown), the second light L2U' may be emitted from the upper surface 122US of the second LGP 122 in a manner similar to the normal light emission. After the second light L2U' are emitted from the first turning film 130, the second light L2U' enter the second polarizer film 214. In the present embodiment, the axial direction of the first polarizing transmission axis 142 of the first polarizer film 140 is substantially parallel to the axial direction of the second polarizing transmission axis 2142 of the second polarizer film 214. Hence, the stray light of the second light L2U' with the polarization direction different from the axial direction of the second polarizing transmission axis 2142 can be filtered out, such that the light emitting efficacy of the second light L2U' provided by the second backlight module 120 to the display panel 210 is not significantly affected by the stray light. As a result, the favorable light emitting quality can be ensured. In the present embodiment, the axial direction of the first polarizing transmission axis 142 is substantially parallel to the axial direction of the second polarizing transmission axis 2142 of the second polarizer film 214; however, people having ordinary skill in the pertinent art can also filter out the stray light through adjusting the included angle between the axial direction of the first polarizing transmission axis 142 and the axial direction of the second polarizing transmission axis 2142 based on actual needs. Here, the included angle between the axial direction of the first polarizing transmission axis 142 of the first absorptive polarizer film 140 and the axial direction of the second polarizing transmission axis 2142 of the second polarizer film 214 substantially falls within the range from 0 degree to 60 degrees, and the design of the included angle within said range ensures that the stray light can be filtered out. Besides, in the display device 200 shown in FIG. 2B, the second backlight module 120 provides the light at a large angle, and the first backlight module 110 also provides the normal light. Thereby, in the second direction D2 (i.e., the horizontal direction), the optical effects achieved by the display device 200 are the wide-view-angle optical effects, i.e., the wide-view-angle display mode, for instance.

It should be mentioned that the control module 220 can adjust the luminance of the forward light provided by the first backlight module 110 and the luminance of the light provided by the second backlight module 120 at a large angle through controlling the value of the first driving current I1 as well as the value of the second driving current I2, such that the uniform visual perception at even view angles can be ensured. As a result, the display device 200 provided herein can display images with favorable quality.

Note that the display device 200 provided in FIG. 2B achieves the wide-view-angle display mode through enabling both the first light source 114 and the second light source 124 to emit light. In another embodiment of the invention, the display device provided in FIG. 2B may achieve the wide-view-angle display mode through not enabling the first light source 114 to emit light but enabling the second light source 124 to emit light. Similarly, the display device provided in FIG. 2B may accomplish the wide-view-angle optical effects, i.e., the wide-view-angle display mode.

In the light source module 100 of the display device 200 provided herein, the included angle between the axial direction of the first polarizing transmission axis 142 of the first absorptive polarizer film 140 and the axial direction of the second polarizing transmission axis 2142 of the second polarizer fill 214 substantially falls within the range from 0 degree to 60 degrees. Hence, in different view angle display modes (e.g., the narrow-view-angle display mode or the wide-view-angle display mode), the light emitting efficacy of the light source module 100 provided herein is relatively unlikely to be affected by stray light, and thus the favorable light emitting quality can be guaranteed. Since the display device 200 provided in the present embodiment of the invention includes said light source module 100, the stray light poses an insignificant impact on the display device 200; thereby, the display device 200 in different view angle display modes can have the favorable image quality.

In another embodiment of the invention, the light source module can be further equipped with a reflector film (not shown). The second backlight module 120 is disposed between the reflector film and the first absorptive polarizer film 140. In the present embodiment, the second light L2 is emitted through an upper surface 122US or a lower surface 122DS of the second LGP 122. The arrangement of the reflector film allows a portion of the second light L2 emitted from the lower surface 122DS of the second LGP 122 to be reflected by the reflector film and enter the second backlight module 120, so as to enhance the utilization efficiency of the second backlight module 120.

In another embodiment of the invention, the light source module 100 may be further equipped with an optical film (not shown) that is disposed between the display panel 210 and the first turning film 130. The optical film is, for instance, a reflective brightness enhancement film or a diffuser film. The arrangement of the optical film allows the display device provided herein to display images with favorable quality.

It should be mentioned that reference numbers and some descriptions provided in the previous exemplary embodiment are also applied in the following exemplary embodiment. The same reference numbers represent the same or similar components in these exemplary embodiments, and repetitive descriptions are omitted.

Figure 3A:
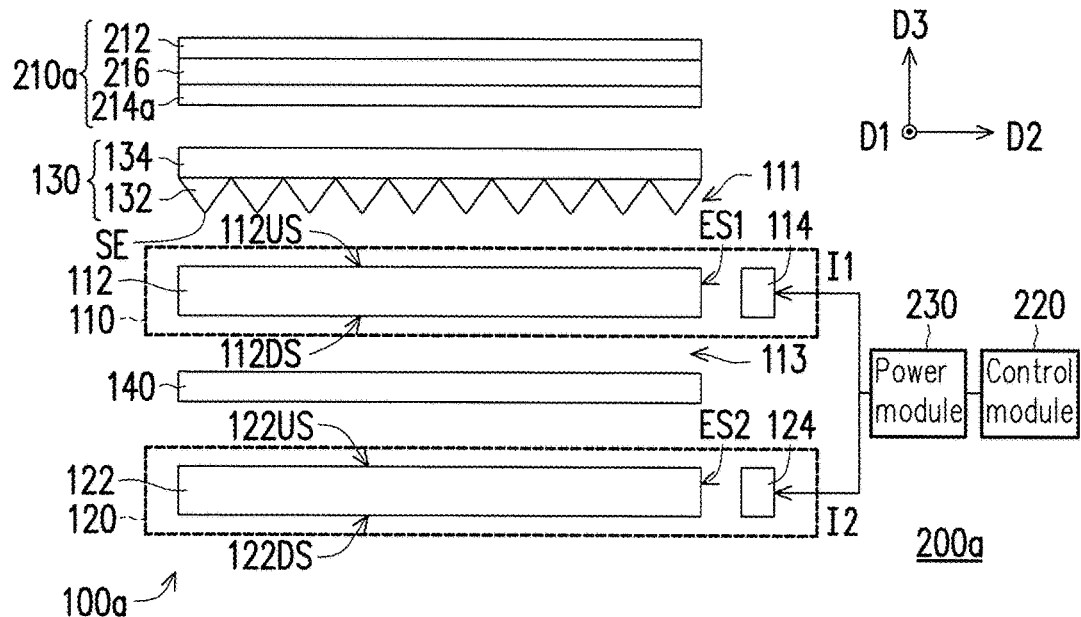
FIG. 3A is a schematic cross-sectional view illustrating a display device according to another embodiment of the invention.
Figure 3B:
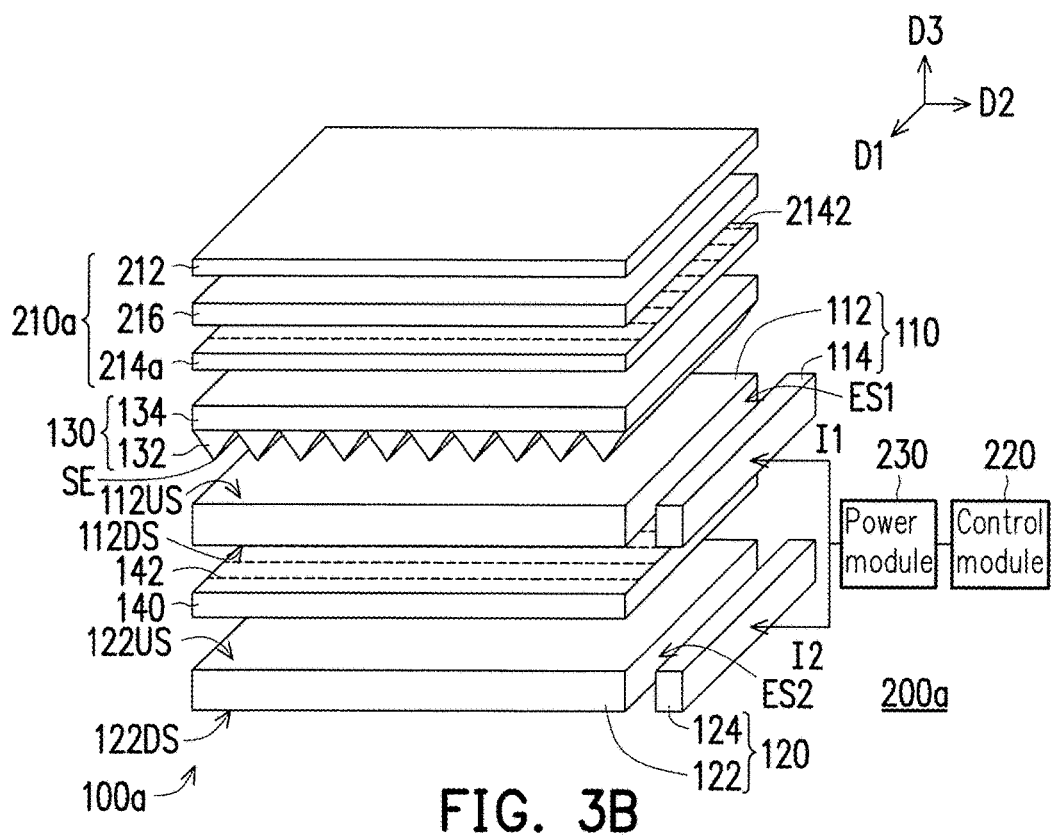
FIG. 3B is an explosive view illustrating the display device depicted in FIG. 3A.

FIG. 3A is a schematic cross-sectional view illustrating a display device according to another embodiment of the invention. FIG. 3B is an explosive view illustrating the display device depicted in FIG. 3A.

With reference to FIG. 3A and FIG. 3B, the display device 200*a* provided in the present embodiment is similar to the display device 200 depicted in FIG. 1A and FIG. 1B, and one of the differences lies in that the included angle between the axial direction of the second polarizing transmission axis 2142 and the axial direction of the first polarizing transmission axis 142 is substantially 0 degree (e.g., both axes are extended along the second direction D2), and the extension direction of the reverse prisms 132 of the first turning film 130 (i.e., the first direction D1) is substantially perpendicular to the axial direction of the second polarizing transmission axis 2142. According to the present embodiment, the axial direction of the second polarizing transmission axis 2142 is substantially parallel to the axial direction of the first polarizing transmission axis 142, and the axial directions of the first polarizing transmission axis 142 and the second polarizing transmission axis 2142 are substantially perpendicular to the extension direction of the reverse prisms 132. Through said arrangement in the display device 200a, the view angles in the second direction D2 (i.e., the horizontal direction) can be more focused, and the amount of light emitted at a large angle can be reduced. Namely, the display device 200a described herein can have better performance in the narrow-view-angle display mode. Besides, the light path of the display device 200a is similar to that depicted in FIG. 2A and FIG. 2B and thus will not be further explained hereinafter.

Figure 4A:
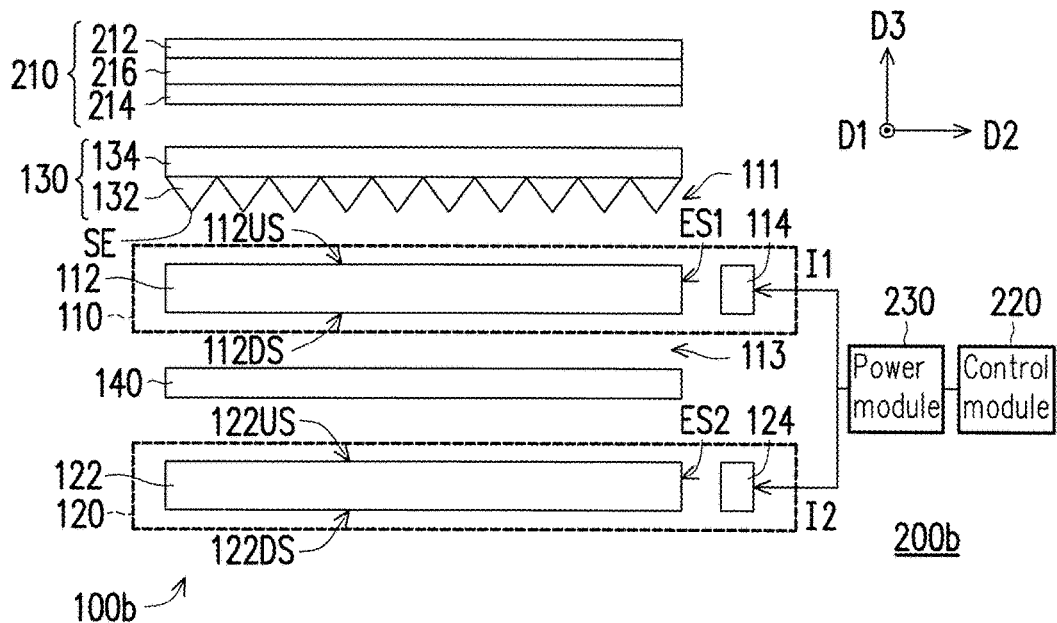
FIG. 4A is a schematic cross-sectional view illustrating a display device according to another embodiment of the invention.
Figure 4B:
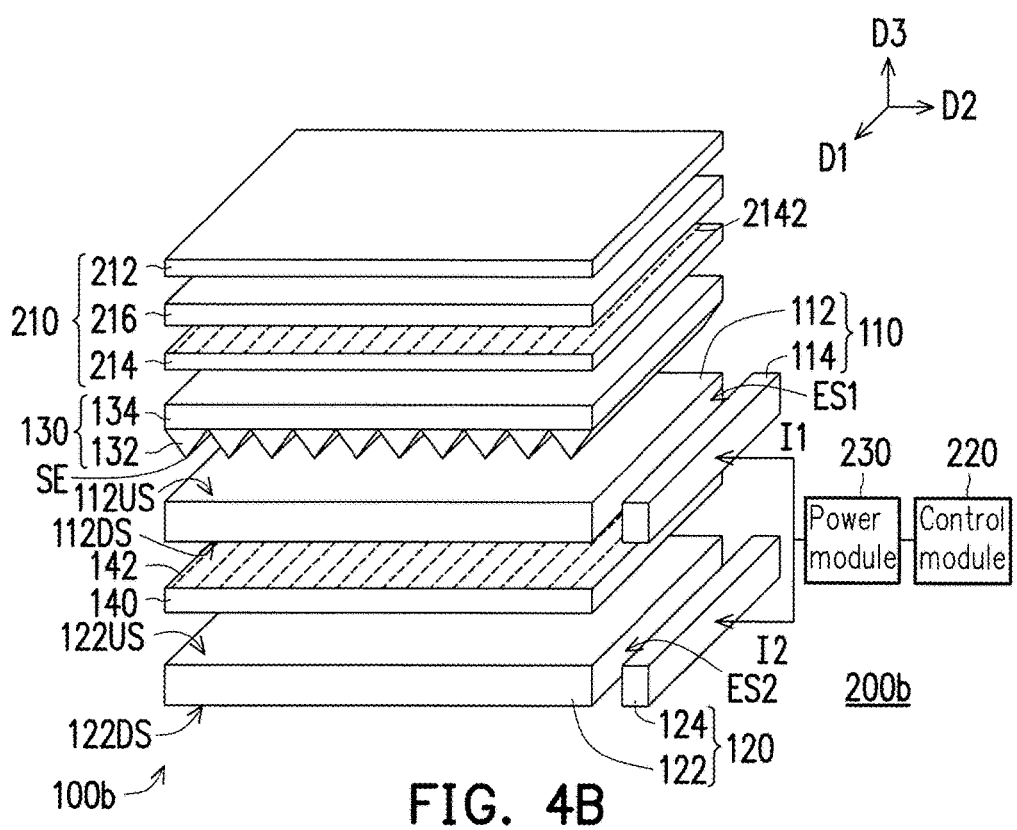
FIG. 4B is an explosive view illustrating the display device depicted in FIG. 4A.

FIG. 4A is a schematic cross-sectional view illustrating a display device according to another embodiment of the invention. FIG. 4B is an explosive view illustrating the display device depicted in FIG. 4A.

With reference to FIG. 4A and FIG. 4B, the display device 200b provided in the present embodiment is similar to the display device 200 depicted in FIG. 1A and FIG. 1B, and one of the differences lies in that the included angle between the axial direction of the second polarizing transmission axis 2142 and the axial direction of the first polarizing transmission axis 142 is substantially 0 degree, and the axial direction of the second polarizing transmission axis 2142 is substantially parallel to the extension direction of the reverse prisms 132 (i.e., the first direction DD. According to the present embodiment, the axial direction of the second polarizing transmission axis 2142 is substantially parallel to the axial direction of the first polarizing transmission axis 142, and the axial directions of the first polarizing transmission axis 142 and the second polarizing transmission axis 2142 are substantially parallel to the extension direction of the reverse prisms 132. Through said arrangement, the overall brightness of the emitted light of the display device 200b provided herein can be further enhanced. Besides, the light path of the display device 200b is similar to that depicted in FIG. 2A and FIG. 2B and thus will not be further explained hereinafter.

In the display device 200a depicted in FIG. 3A and FIG. 3B and the display device 200b depicted in FIG. 4A and FIG. 4B, the axial direction of the second polarizing transmission axis 2142 of the second polarizer film 214a or 214b is substantially parallel to the axial direction of the first polarizing transmission axis 142 (i.e., the second direction D2 or the first direction D1), and the axial direction of the second polarizing transmission axis 2142 is substantially perpendicular or parallel to the extension direction of the reverse prisms 132. As such, the display device 200a depicted in FIG. 3A and FIG. 3B and the display device 200b depicted in FIG. 4A and FIG. 4B can achieve respective display effects.

Figure 5A:
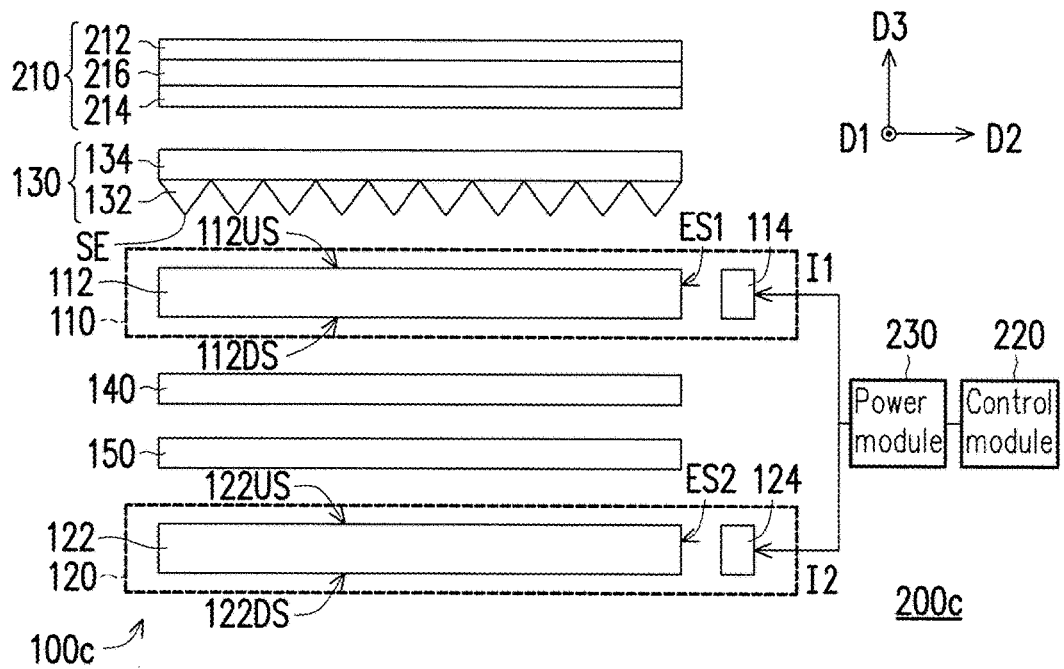
FIG. 5A is a schematic cross-sectional view illustrating a display device according to another embodiment of the invention.
Figure 5B:
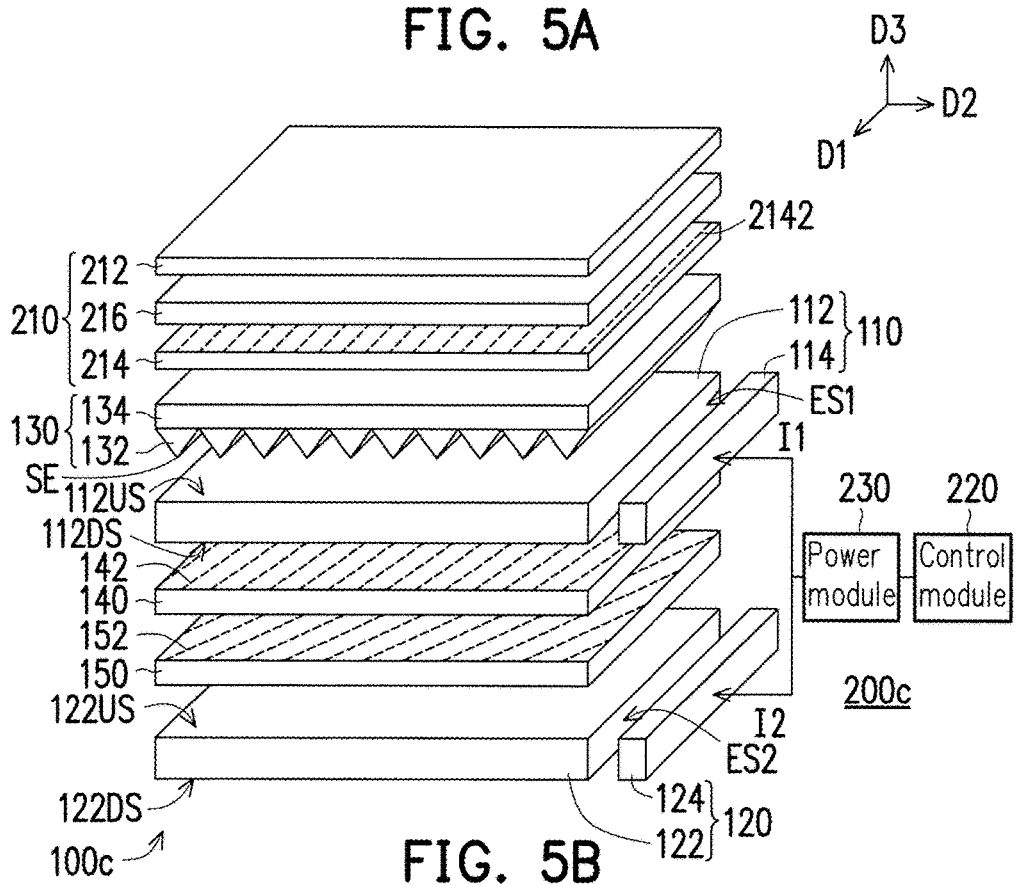
FIG. 5B is an explosive view illustrating the display device depicted in FIG. 5A.

FIG. 5A is a schematic cross-sectional view illustrating a display device according to another embodiment of the invention. FIG. 5B is an explosive view illustrating the display device depicted in FIG. 5A.

With reference to FIG. 5A and FIG. 5B, the display device 200c provided in the present embodiment is similar to the display device 200 depicted in FIG. 1A and FIG. 1B, and one of the differences lies in that the light source module 100c provided herein further includes a reflective polarizer film 150. The reflective polarizer film 150 is disposed between the first absorptive polarizer film 140 and the second backlight module 120. The reflective polarizer film 150 has a third polarizing transmission axis 152. An included angle between an axial direction of the third polarizing transmission axis 152 and the axial direction of the first polarizing transmission axis 142 is substantially greater than or equal to 0 degree and less than 90 degrees.

Besides, in the present embodiment, the reflective polarizer film 150 is, for instance, an advanced polarization conversion film (APCF), a dual brightness enhancement film (DBEF), or an advanced polarizer film (APF). Note that the reflective polarizer film 150 provided in the present embodiment reflects one portion of light with a specific linear polarization direction that is substantially parallel to a reflective axis (not shown) of the reflective polarizer film 150. By contrast, the reflective polarizer film 150 allows the other portion of light with another specific linear polarization direction to pass through, and the another specific linear polarization direction is substantially parallel to the third polarizing transmission axis 152.

Figure 6A:
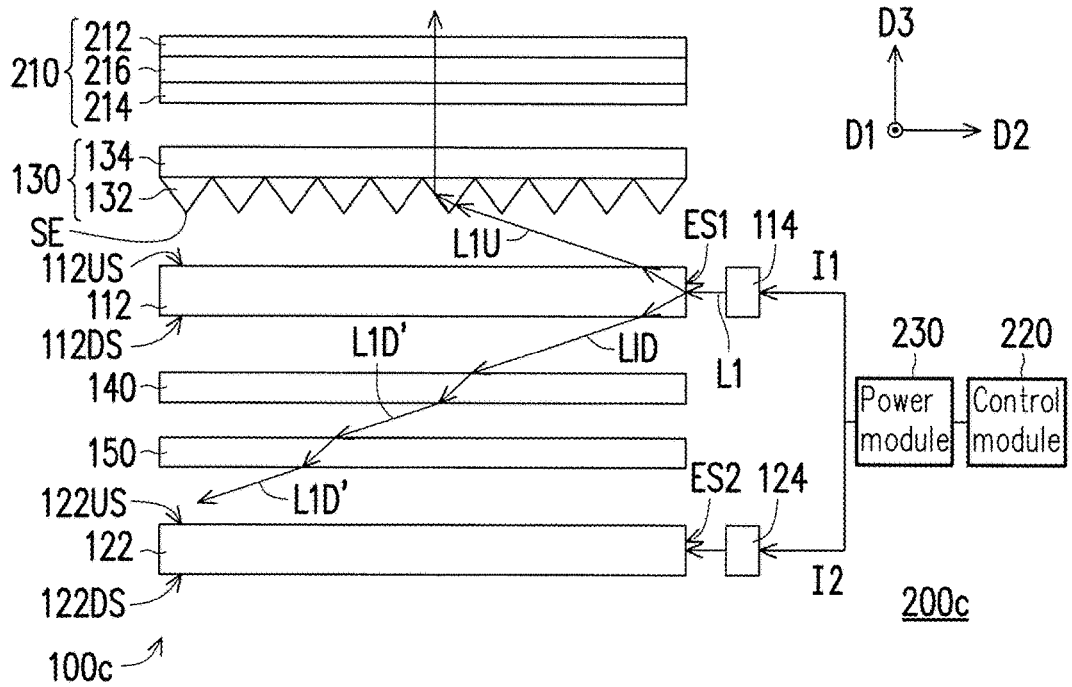
FIG. 6A and FIG. 6B are schematic views illustrating a light path according to the embodiment shown in FIG. 5A and FIG. 5B.
Figure 6B:
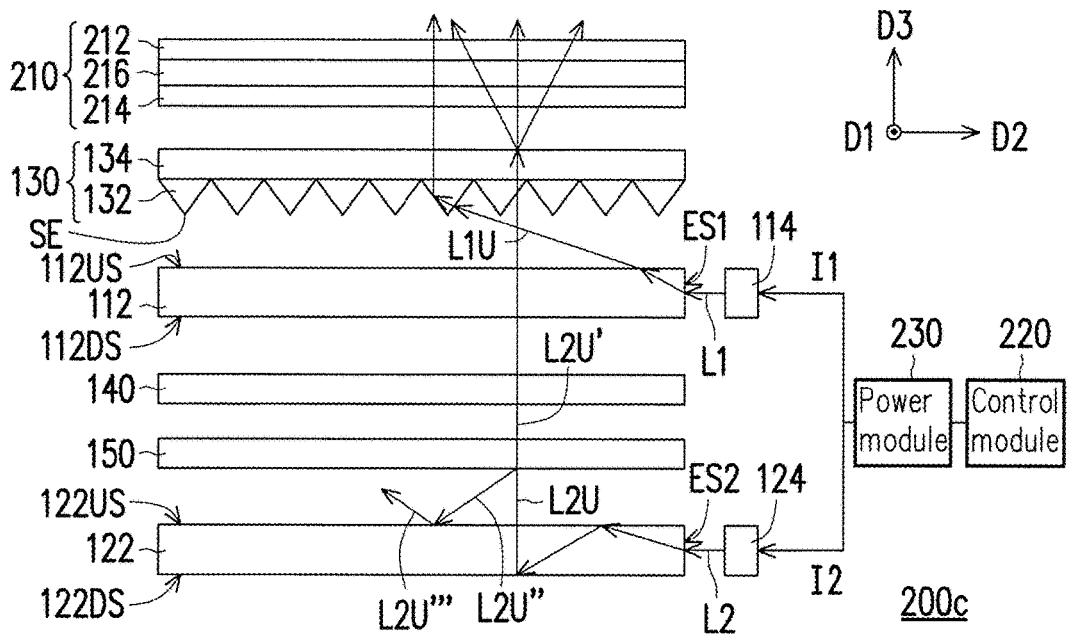

FIG. 6A and FIG. 6B are schematic views illustrating a light path according to the embodiment shown in FIG. 5A and FIG. 5B.

FIG. 6A and FIG. 6B are similar to FIG. 2A and FIG. 2B. With reference to FIG. 6A, the difference between FIG. 6A and FIG. 2A lies in that the brightness of the first light L1D' is further reduced because the included angle between the axial direction of the third polarizing transmission axis 152 and the axial direction of the first polarizing transmission axis 142 is substantially greater than or equal to 0 degree and less than 90 degrees. Except for said difference, the light depicted in FIG. 6A passes through the polarizer according to the transmission and absorption principle similar to that provided in FIG. 2A, and therefore no further description in this regard will be provided hereinafter. In the narrow-view-angle display mode, the stray light reflected by the bottom of the first backlight module 110 is relatively insignificant. As a result, the display device 200c provided herein can display images with favorable quality.

With reference to FIG. 6B, the difference between FIG. 6B and FIG. 2B lies in that the second light L2U is transmitted to the reflective polarizer film 150 before the second light L2U is transmitted to the first absorptive polarizer film 140. Thereby, in the second light L2U, a portion of the second light L2U' with the polarization direction substantially parallel to the polarization direction of the third polarizing transmission axis 152 passes through the reflective polarizer film 150, and the other portion of the second light L2U" with the polarization direction substantially perpendicular to the polarization direction of the third polarizing transmission axis 152 is reflected by the reflective polarizer film 150 and recycled by the second LGP 122. The recycled second light L2U''' again enters the reflective polarizer film 150. As a result, the light utilization efficiency of the second backlight module 120 in the display device 200c provided herein can be further improved.

Figure 7A:
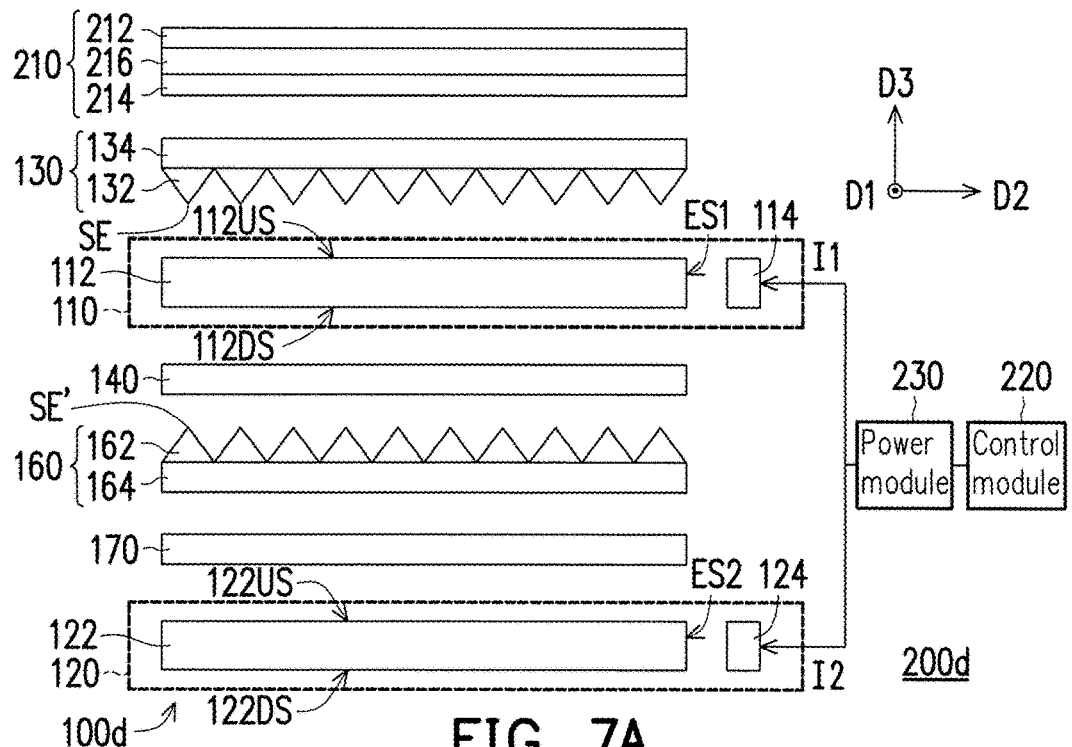
FIG. 7A is a schematic cross-sectional view illustrating a display device according to another embodiment of the invention.
Figure 7B:
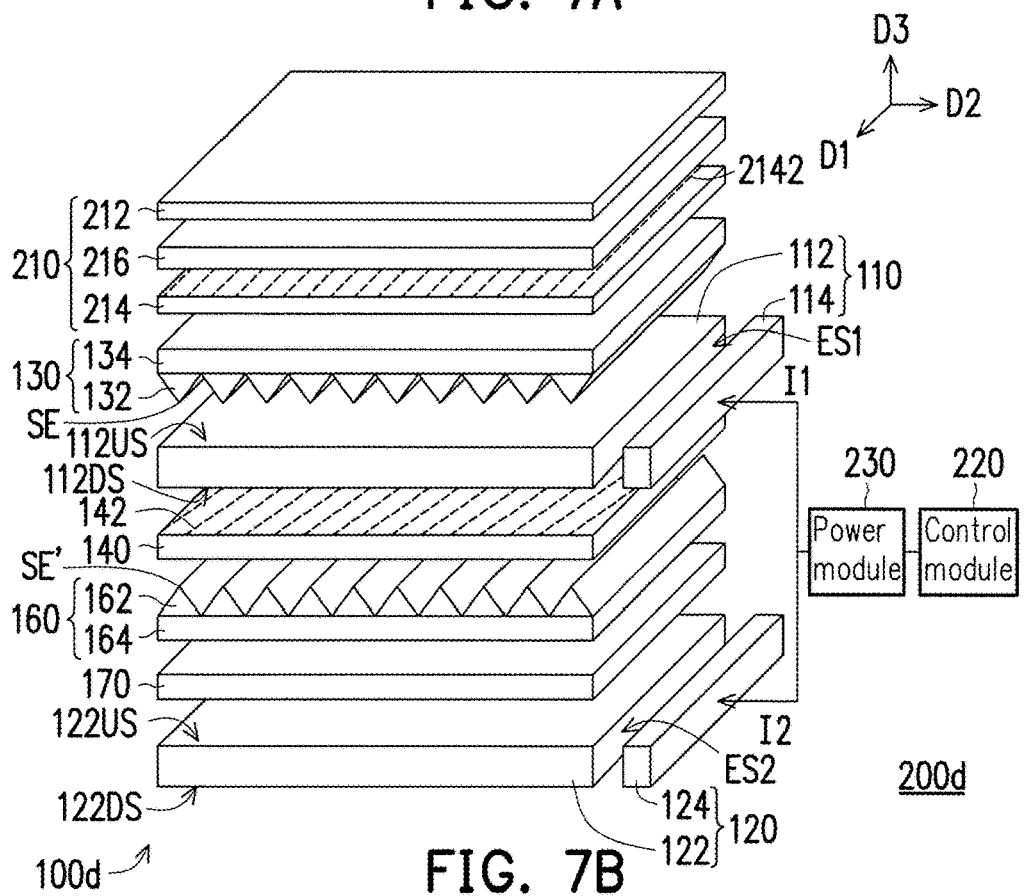
FIG. 7B is an explosive view illustrating the display device depicted in FIG. 7A.
Figure 7C:
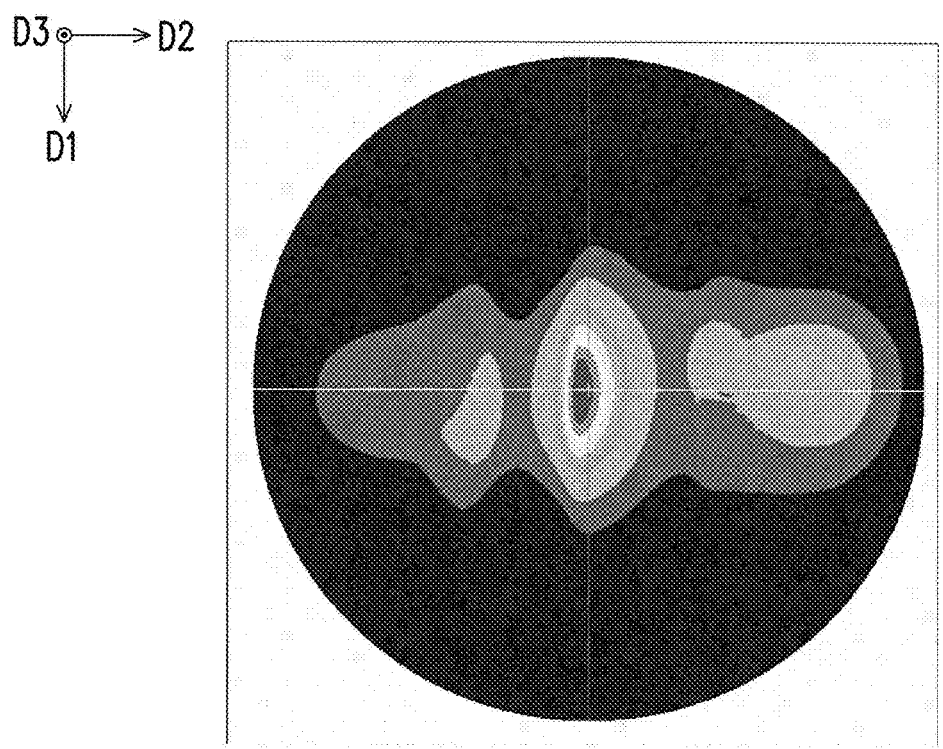
FIG. 7C, FIG. 7D, and FIG. 7E illustrate optical simulation results in the wide-view-angle display mode according to different included angles between the axial direction of the first polarizing transmission axis and the axial direction of the second polarizing transmission axis in the display device provided in the embodiment shown in FIG. 7A and FIG. 7B.
Figure 7D:
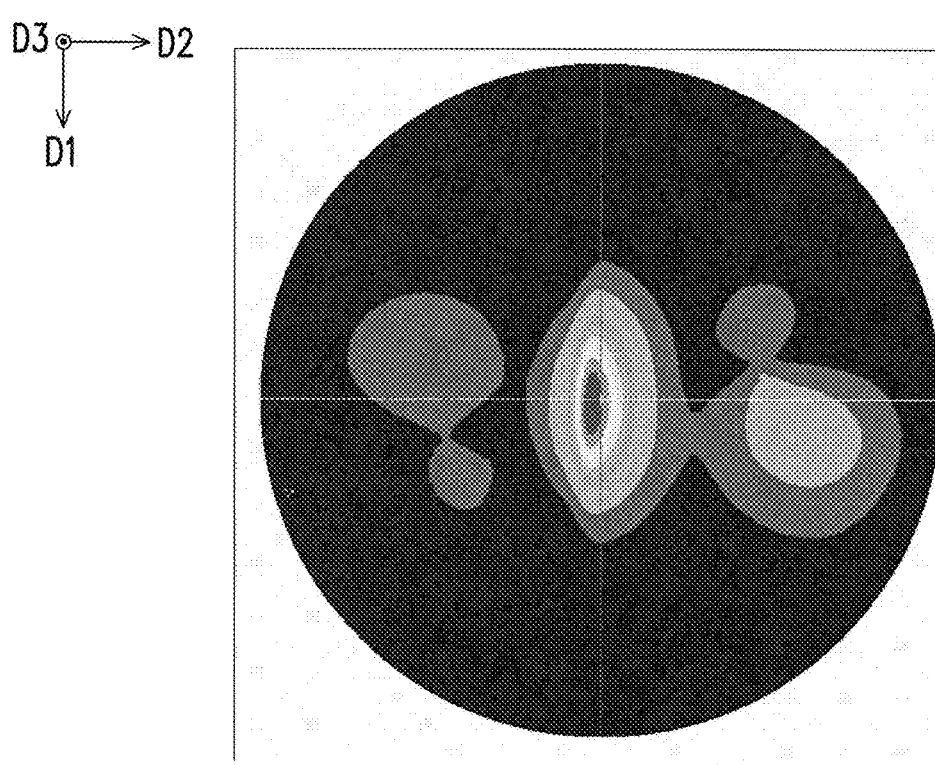
Figure 7E:
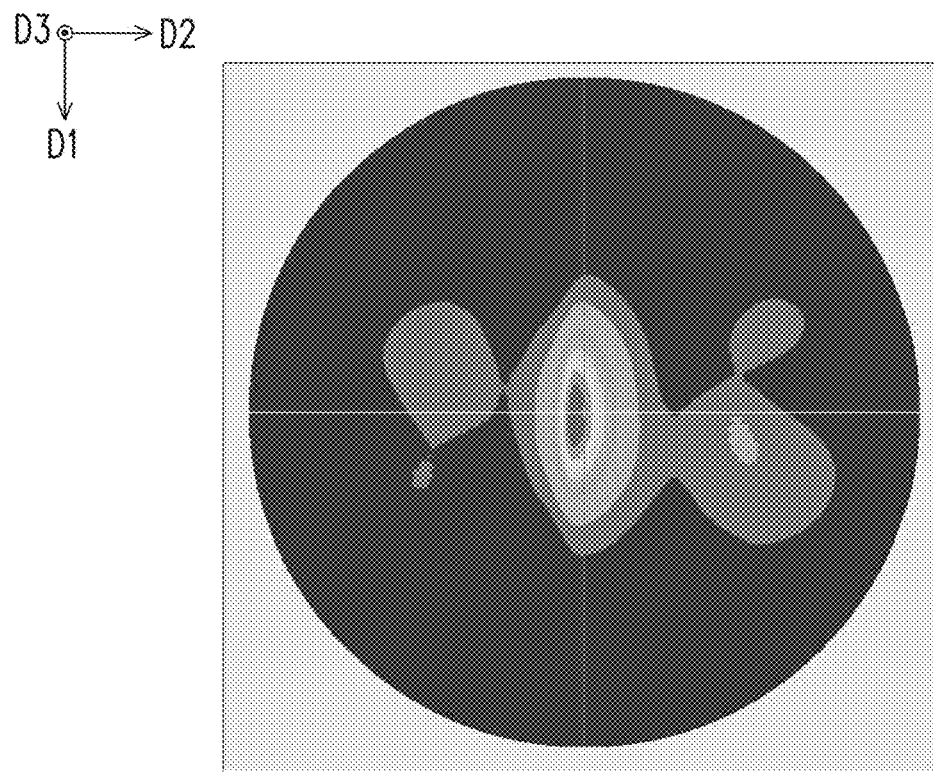
Figure 7F:
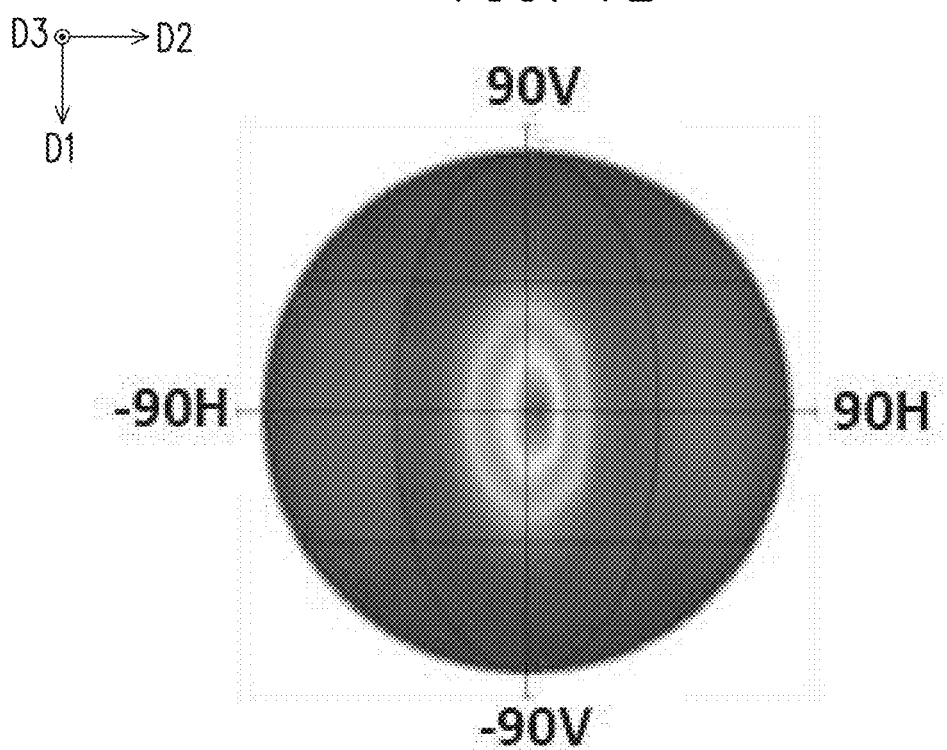
FIG. 7F illustrates optical simulation results in the narrow-view-angle display mode in the display device provided in the embodiment shown in FIG. 7A and FIG. 7B.
Figure 7G:
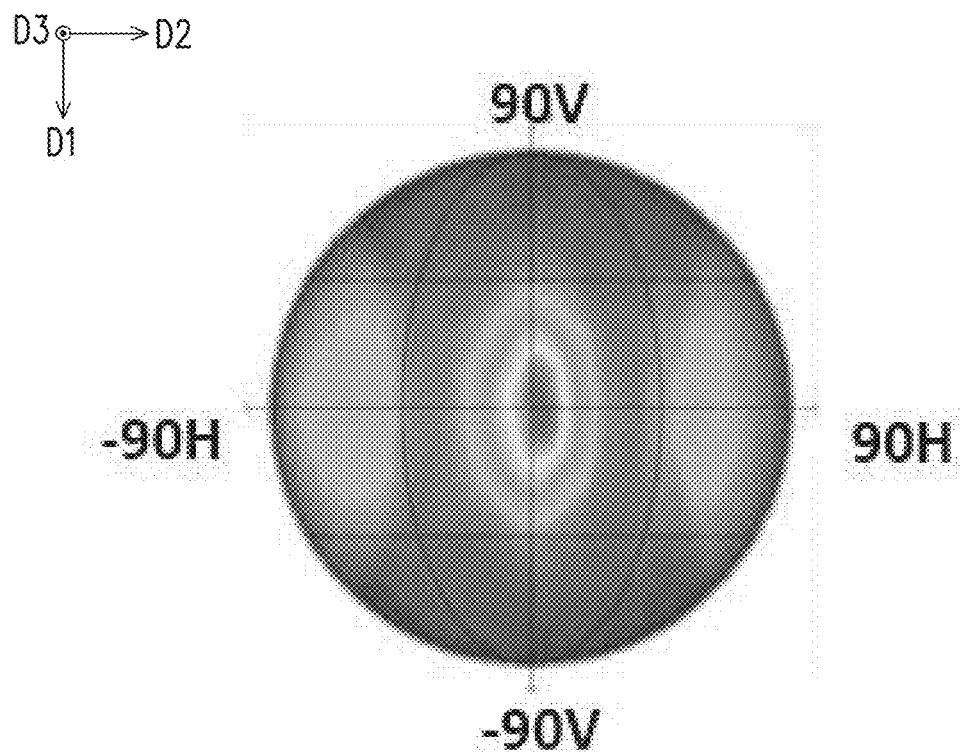
FIG. 7G illustrates optical simulation results in the wide-view-angle display mode in the display device provided in the embodiment shown in FIG. 7A and FIG. 7B.
Figure 7H:
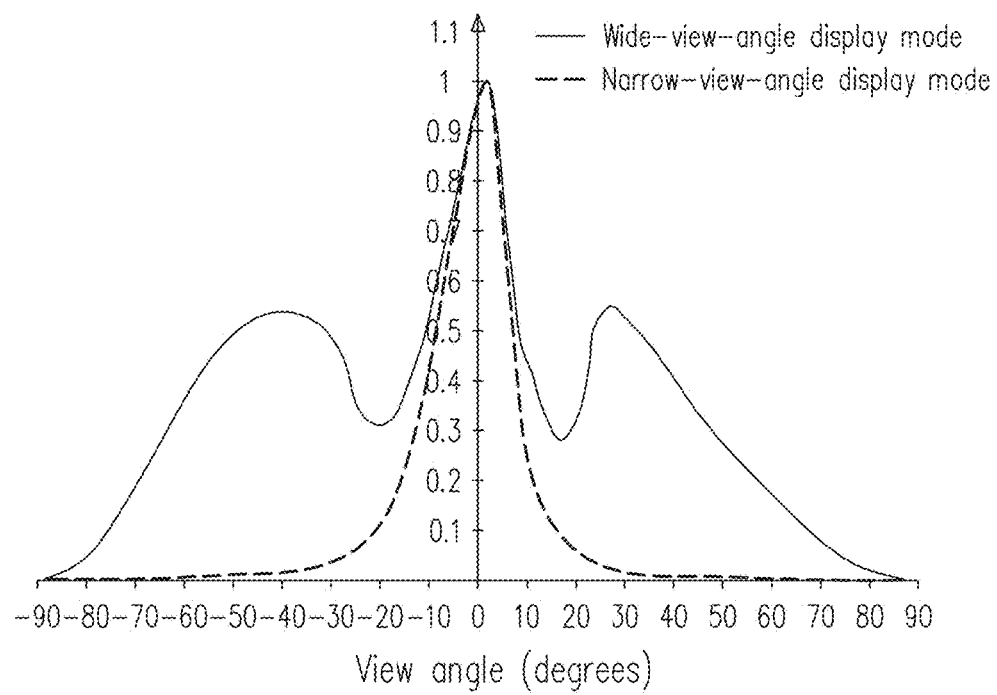
FIG. 7H illustrates experimental results of view angles and luminance of the display device in a second direction in different display modes according to the embodiment shown in FIG. 7A and FIG. 7B.

FIG. 7A is a schematic cross-sectional view illustrating a display device according to another embodiment of the invention. FIG. 7B is an explosive view illustrating the display device depicted in FIG. 7A. FIG. 7C, FIG. 7D, and FIG. 7E illustrate optical simulation results in the wideview-angle display mode according to different included angles between the axial direction of the first polarizing transmission axis 142 and the axial direction of the second polarizing transmission axis 2142 in the display device provided in the embodiment shown in FIG. 7A and FIG. 7B. FIG. 7F illustrates optical simulation results in the narrow-view-angle display mode in the display device provided in the embodiment shown in FIG. 7A and FIG. 7B. FIG. 7G illustrates optical simulation results in the wide-view-angle display mode in the display device provided in the embodiment shown in FIG. 7A and FIG. 7B. FIG. 7H illustrates experimental results of view angles and luminance of the display device in a second direction in different display modes according to the embodiment shown in FIG. 7A and FIG. 7B.

With reference to FIG. 7A and FIG. 7B, the display device 200d provided in the present embodiment is similar to the display device 200 depicted in FIG. 1A and FIG. 1B, and one of the differences lies in that the light source module 100d provided herein further includes a prism film 160 and a diffuser film 160. The prism film 160 and the diffuser film 170 are located between the first absorptive polarizer film 140 and the second backlight module 120. The diffuser film 170 is located between the prism film 160 and the second backlight module 120. In the present embodiment, the prism film 160 is, for instance, a brightness enhancement film (BEF) Specifically, the prism film 160 includes a plurality of prisms 162 and a transparent substrate 164. The prisms 162 are located on the transparent substrate 164. An end SE' of each prism 162 faces toward the first absorptive polarizer film 140. The prisms 162 are arranged in the second direction D2 and extended in the first direction D1, for instance. Thereby, the second light L2U emitted from the upper surface 122US of the second LGP 122 sequentially passes through the diffuser film 170 and the prism film 160. The diffuser film 170 is configured to diffuse the second light L2U emitted from the second LGP 122, such that uniformity of the planar light source (generated by the second light L2U) can be improved. The prism film 160 is configured to converge the light emitting angle of the diffused second light L2U in the second direction D2, so as to improve the directivity of the second light L2U. Thereby, the amount of the second light L2U entering the first absorptive polarizer film 140 is relatively large, such that the light utilization efficiency of the display device 200d provided herein can be increased.

In another embodiment of the invention, the prisms 162 are arranged in the first direction D1 and extended in the second direction D2, for instance. Through said arrangement, the light emitting angle of the diffused second light beam L2U in the first direction D1 can be converged. It is likely to use two prism films 160 in other embodiments of the invention. The extension direction of the prisms 162 of one of the prism films 160 is the first direction D1, and the extension direction of the prisms 162 of the other prism film 160 is the second direction D2. Through said arrangement, the light emitting angle of the diffused second light beam L2U in the first direction D1 and the second direction D2 can be converged. In other embodiments of the invention, as long as the second backlight module 120 can emit forward light, other combinations of films can also be applied.

Please refer to FIG. 7C, FIG. 7D and FIG. 7E. FIG. 7C shows the optical simulation results corresponding to the condition that the included angle between the axial direction of the first polarizing transmission axis 142 and the axial direction of the second polarizing transmission axis 2142 is substantially 0 degree. FIG. 7D shows the optical simulation results corresponding to the condition that the included angle between the axial direction of the first polarizing transmission axis 142 and the axial direction of the second polarizing transmission axis 2142 is substantially 60 degrees. FIG. 7E shows the optical simulation results corresponding to the condition that the included angle between the axial direction of the first polarizing transmission axis 142 and the axial direction of the second polarizing transmission axis 2142 is substantially 90 degrees. Comparatively speaking, in FIG. 7C, the view angle in the second direction D2 is the widest, the brightness is the highest, and the wide-view-angle display effects are the most satisfactory. In FIG. 7D, the view angle in the second direction D2 is the second widest, the brightness is the second highest, and the human visual perception is acceptable. In FIG. 7E, the included angle between the axial direction of the first polarizing transmission axis 142 and the axial direction of the second polarizing transmission axis 2142 is greater than 60 degrees (e.g., substantially 90 degrees); as shown in FIG. 7A, the view angle in the second direction D2 is small and not continuous, the brightness is small, and the wide-view-angle display effects are unsatisfactory. It can thus be concluded that the display device 200d provided herein can achieve satisfactory optical effects when the included angle between the axial direction of the first polarizing transmission axis 142 and the axial direction of the second polarizing transmission axis 2142 substantially falls within a range from 0 degree to 60 degrees.

With reference to FIG. 7F, in the narrow-view-angle display mode, the display device 200d provided in the present embodiment has the narrow view angle in the second direction D2 (i.e., the horizontal direction), and the view angle is about ±10 degrees. Hence, the display device 200d achieves the narrow-view-angle display effects.

With reference to FIG. 7G, in the wide-view-angle display mode, the display device 200d provided in the present embodiment has the wide view angle in the second direction D2 (i.e., the horizontal direction). Hence, the display device 200d achieves the wide-view-angle display effects.

With reference to FIG. 7H, the horizontal axis in FIG. 7H represents the view angle of the second direction D2 (i.e., the horizontal direction), and the vertical axis in FIG. 7H represents normalized luminance. As shown in FIG. 7H, when the display device 200d provided herein is in the narrow-view-angle display mode, the peak of the luminance mainly falls within the view angle range from −20 degrees to 20 degrees. By contrast, as shown in FIG. 7H, when the display device 200d provided herein is in the wide-view-angle display mode, the peak of the luminance falls within three view angle ranges, i.e., the range from −20 degrees to 20 degrees, the range from 20 degrees to 60 degrees, and the range from −20 degrees to −70 degrees. Note that the luminance of the display device 200d provided herein can stay consistent in different view angle display modes when the peak of the luminance falls within the view angle range from −20 degrees to 20 degrees. That is, according to the present embodiment, the luminance of the display device 200d in the narrow view angle range is not reduced when the display device 200d is switched to different view angles. Besides, in the present embodiment, the luminance of the display device 200d in the wide-view-angle display mode is greater than the luminance of the display device 200d in the narrow-view-angle display mode. Moreover, in different view angle display modes, the image contrast and the image quality of the display device 200d provided herein can stay constant. That is, the image contrast and the image quality of the display device 200d provided herein are not scarified when the display device 200d is switched to different view angles.

Note that the experimental results of the view angles and the luminance in the second direction as shown in FIG. 7H are obtained while a certain value of the first driving current I1 and a certain value of the second driving current I2 are given. Other experimental results can be obtained on the condition that the control module 220 is applied to control the value of the first driving current I1 as well as the value of the second driving current I2, so as to correspondingly adjust the luminance of the forward light provided by the first backlight module 110 and the luminance of the light provided by the second backlight module 120 at a large angle, such that the uniform visual perception at even view angles can be ensured. The invention is not limited to the experimental results exemplified herein.

Figure 8A:
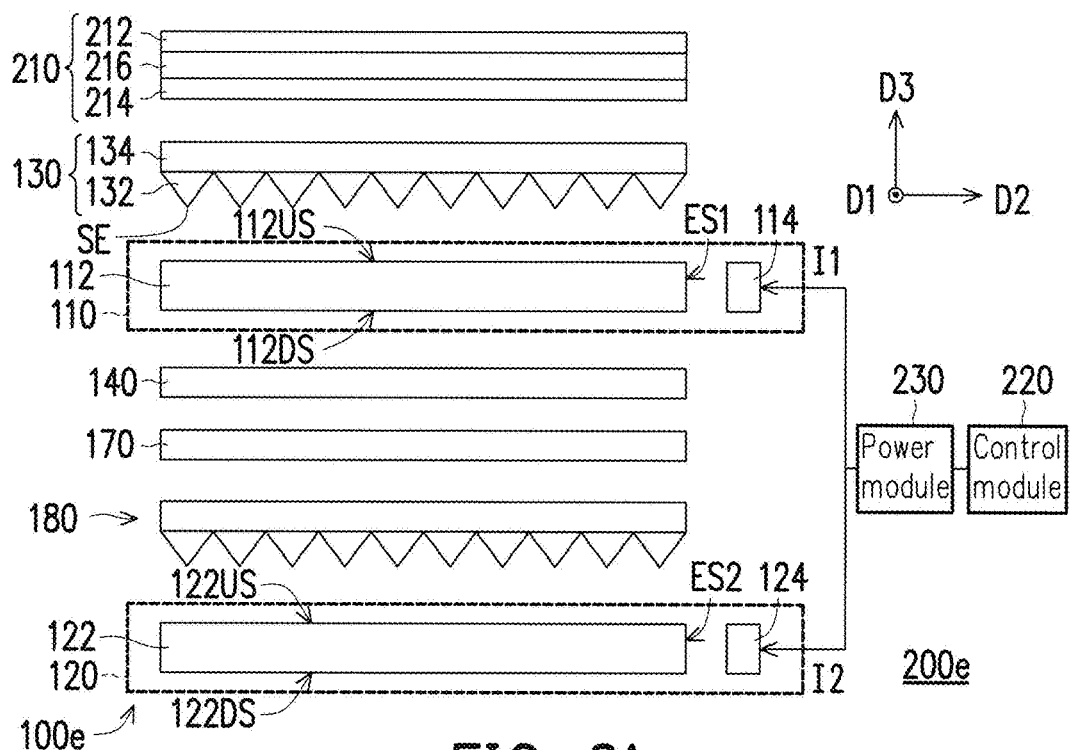
FIG. 8A is a schematic cross-sectional view illustrating a display device according to another embodiment of the invention.
Figure 8B:
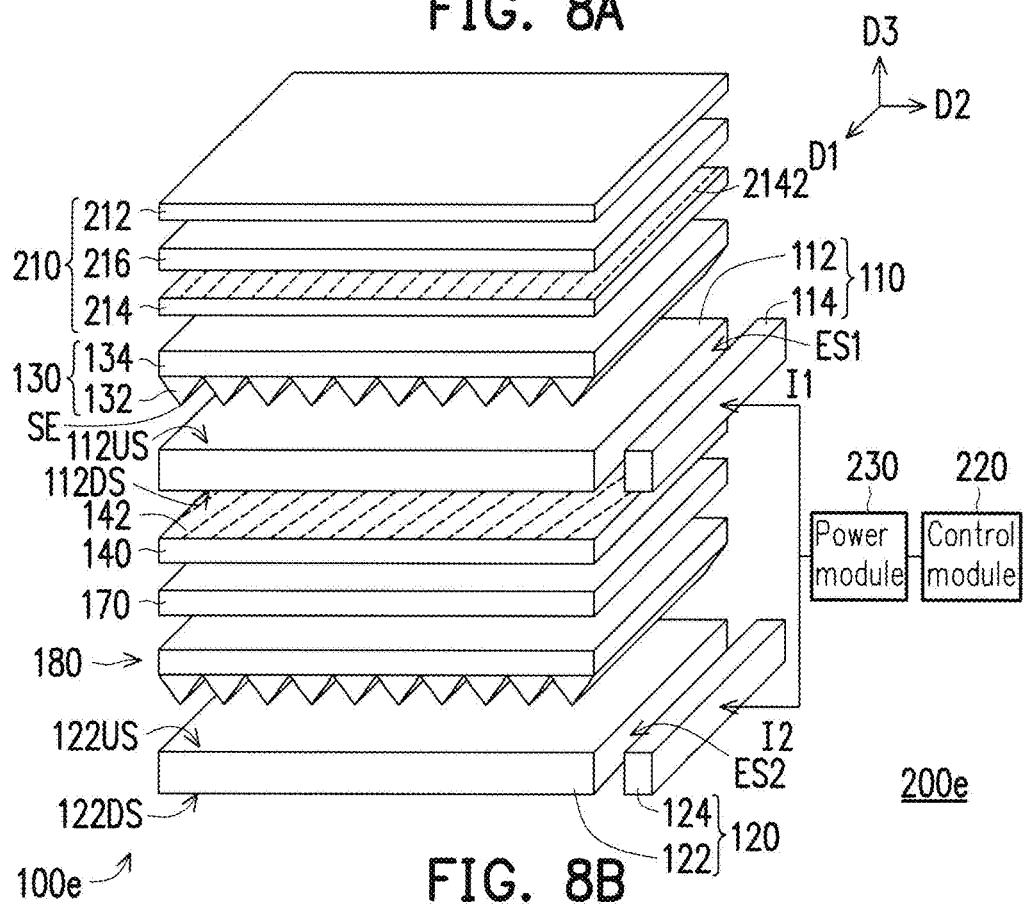
FIG. 8B is an explosive view illustrating the display device depicted in FIG. 8A.

FIG. 8A is a schematic cross-sectional view illustrating a display device according to another embodiment of the invention. FIG. 8B is an explosive view illustrating the display device depicted in FIG. 8A.

With reference to FIG. 8A and FIG. 8B, the display device 200e provided in the present embodiment is similar to the display device 200 depicted in FIG. 1A and FIG. 1B, and one of the differences lies in that the light source module 100e provided herein further includes a second turning film 180 and a diffuser film 170. The second turning film 180 and the diffuser film 170 are located between the first absorptive polarizer film 140 and the second backlight module 120. The second turning film 180 is located between the diffuser film 170 and the second backlight module 120. Thereby, the second light L2U emitted from the upper surface 122US of the second LGP 122 sequentially passes through the second turning film 180 and the diffuser film 170. The second turning film 180 is configured to converge the light emitting angle of the second light L2U in the second direction D2, so as to improve the directivity of the second light L2U. The diffuser film 170 is configured to diffuse the second light L2U emitted from the second turning film 180, such that uniformity of the planar light source (generated by the second light L2U) can be improved. Thereby, the amount of the second light L2U entering the first absorptive polarizer film 140 is relatively large, such that the light utilization efficiency of the second backlight module 120 can be increased.

Figure 9A:
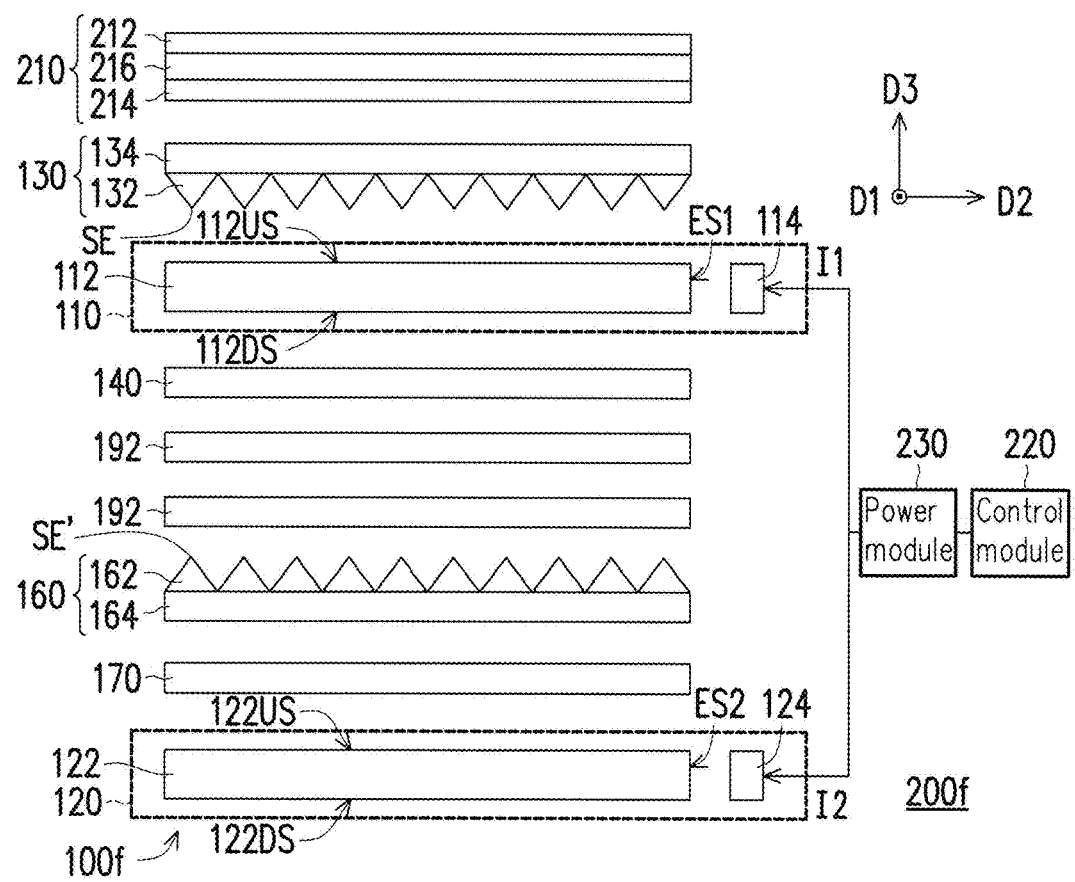
FIG. 9A is a schematic cross-sectional view illustrating a display device according to another embodiment of the invention.
Figure 9B:
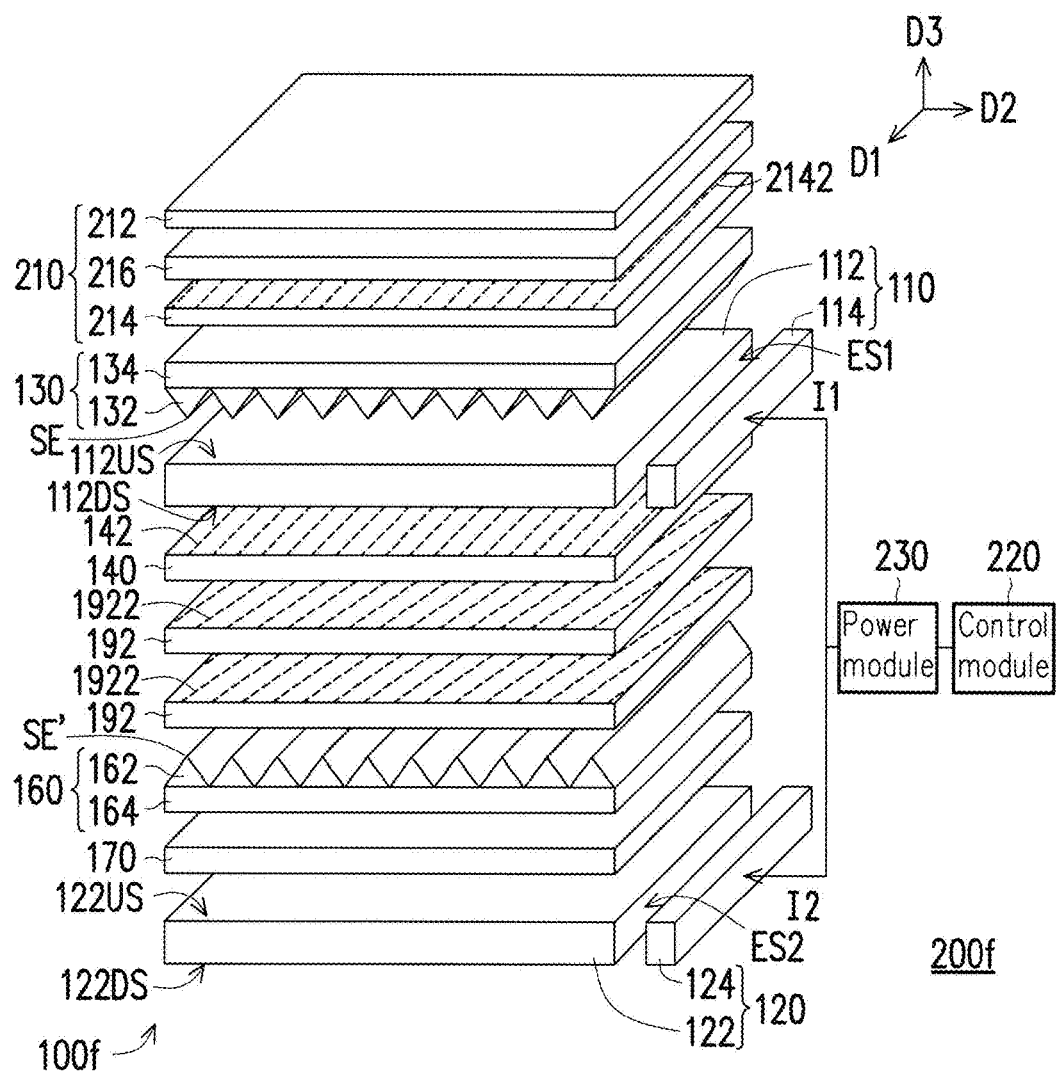
FIG. 9B is an explosive view illustrating the display device depicted in FIG. 9A.
Figure 9C:
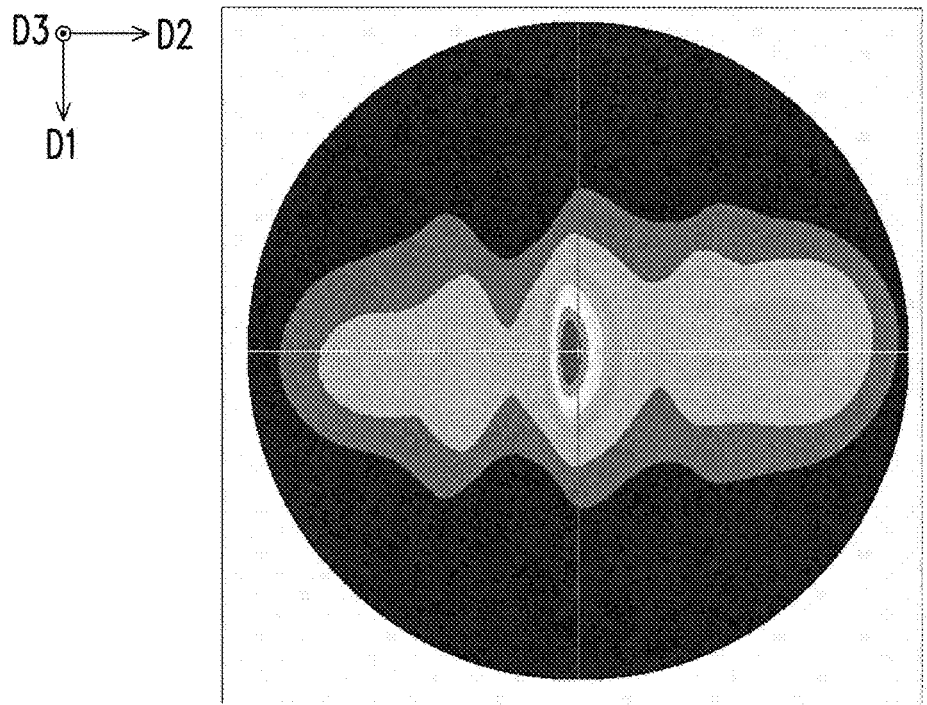
FIG. 9C, FIG. 9D, and FIG. 9E illustrate optical simulation results in the wide-view-angle display mode according to different included angles between the axial direction of the fourth polarizing transmission axis and the axial direction of the first polarizing transmission axis in the display device provided in the embodiment shown in FIG. 9A and FIG. 9B.
Figure 9D:
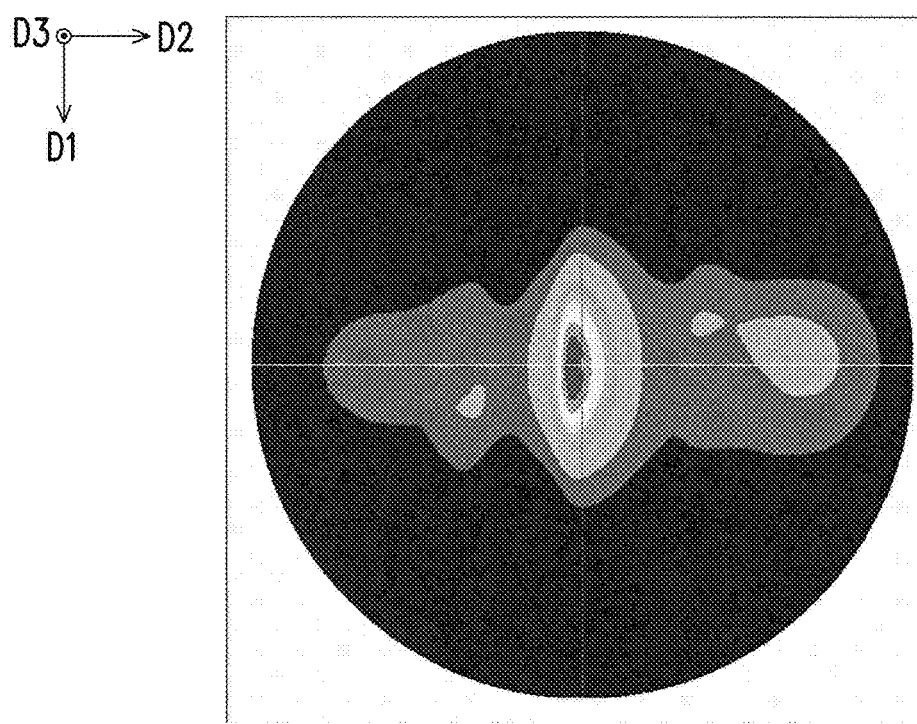
Figure 9E:
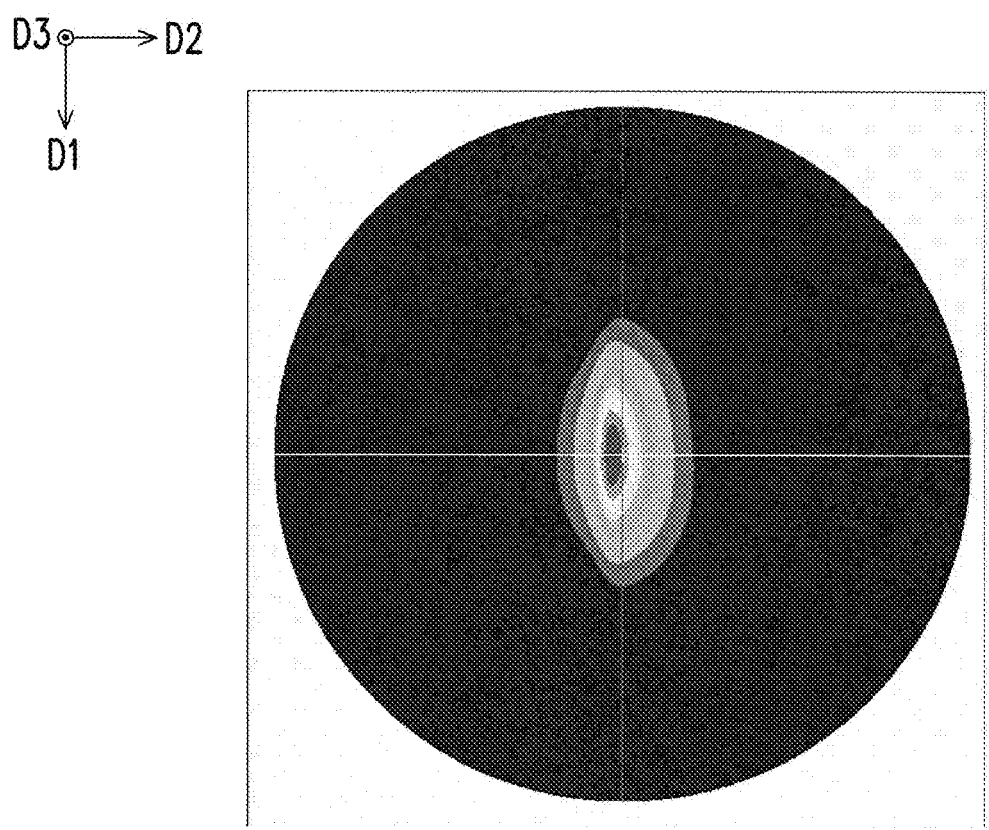

FIG. 9A is a schematic cross-sectional view illustrating a display device according to another embodiment of the invention. FIG. 9B is an explosive view illustrating the display device depicted in FIG. 9A. FIG. 9C, FIG. 9D, and FIG. 9E illustrate optical simulation results in the wide-view-angle display mode according to different included angles between the axial direction of the fourth polarizing transmission axis and the axial direction of the first polarizing transmission axis in the display device provided in the embodiment shown in FIG. 9A and FIG. 9B.

With reference to FIG. 9A and FIG. 9B, the display device 200f provided in the present embodiment is similar to the display device 200b depicted in FIG. 4A and FIG. 4B, and one of the differences lies in that the light source module 100f provided herein further includes a plurality of second absorptive polarizer films 192, a prism film 160, and a diffuser film 170. The second absorptive polarizer films 192 are located between the first absorptive polarizer film 140 and the second backlight module 120. Each of the second absorptive polarizer films 192 has a fourth polarizing transmission axis 1922. An included angle between an axial direction of the fourth polarizing transmission axis 1922 and the axial direction of the first polarizing transmission axis 142 is substantially greater than or equal to 0 degree and less than 90 degrees. In FIG. 9A and FIG. 9B, the number of the second absorptive polarizer films 192 is two, for instance, which should however not be construed as a limitation to the invention. Besides, in the present embodiment, the prism film 160 is located between the second absorptive polarizer films 192 and the diffuser film 170. The diffuser film 170 is located between the prism film 160 and the second backlight module 120.

Please refer to FIG. 9C, FIG. 9D, and FIG. 9E. FIG. 9C shows the optical simulation results corresponding to the condition that the included angle between the axial direction of the fourth polarizing transmission axis 1922 and the axial direction of the first polarizing transmission axis 142 is substantially 0 degree. FIG. 9D shows the optical simulation results corresponding to the condition that the included angle between the axial direction of the fourth polarizing transmission axis 1922 and the axial direction of the first polarizing transmission axis 142 is substantially 45 degrees. FIG. 9E shows the optical simulation results corresponding to the condition that the included angle between the axial direction of the fourth polarizing transmission axis 1922 and the axial direction of the first polarizing transmission axis 142 is substantially 90 degrees. Comparatively speaking, in FIG. 9C, the view angle in the second direction. D2 is the widest, the brightness is the highest, and the wide-view-angle display effects are the most satisfactory. In FIG. 9D, the view angle in the second direction D2 is the second widest, the brightness is the second highest, and the human visual perception is acceptable. In FIG. 9E, the included angle between the axial direction of the fourth polarizing transmission axis 1922 and the axial direction of the first polarizing transmission axis 142 is greater than 45 degrees (e.g., substantially 90 degrees); as shown in FIG. 9E, the brightness in the second direction D2 at the wide view angle is almost zero, and no wide-view-angle display effects are accomplished. It can thus be concluded that the display device 200f provided herein can achieve satisfactory optical effects when the included angle between the axial direction of the fourth polarizing transmission axis 1922 and the axial direction of the first polarizing transmission axis 142 substantially falls within a range from 0 degree to 90 degrees.

Figure 10A:
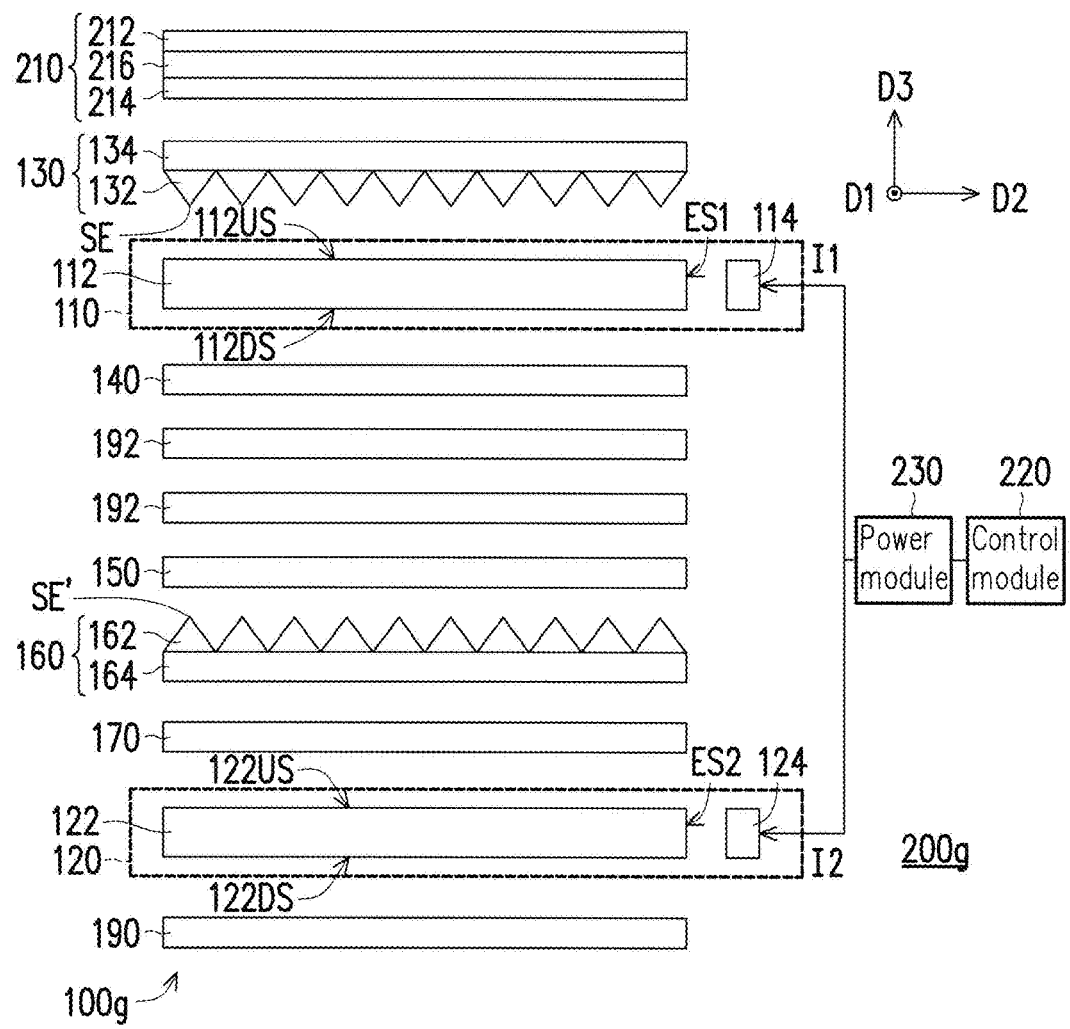
FIG. 10A is a schematic cross-sectional view illustrating a display device according to another embodiment of the invention.
Figure 10B:
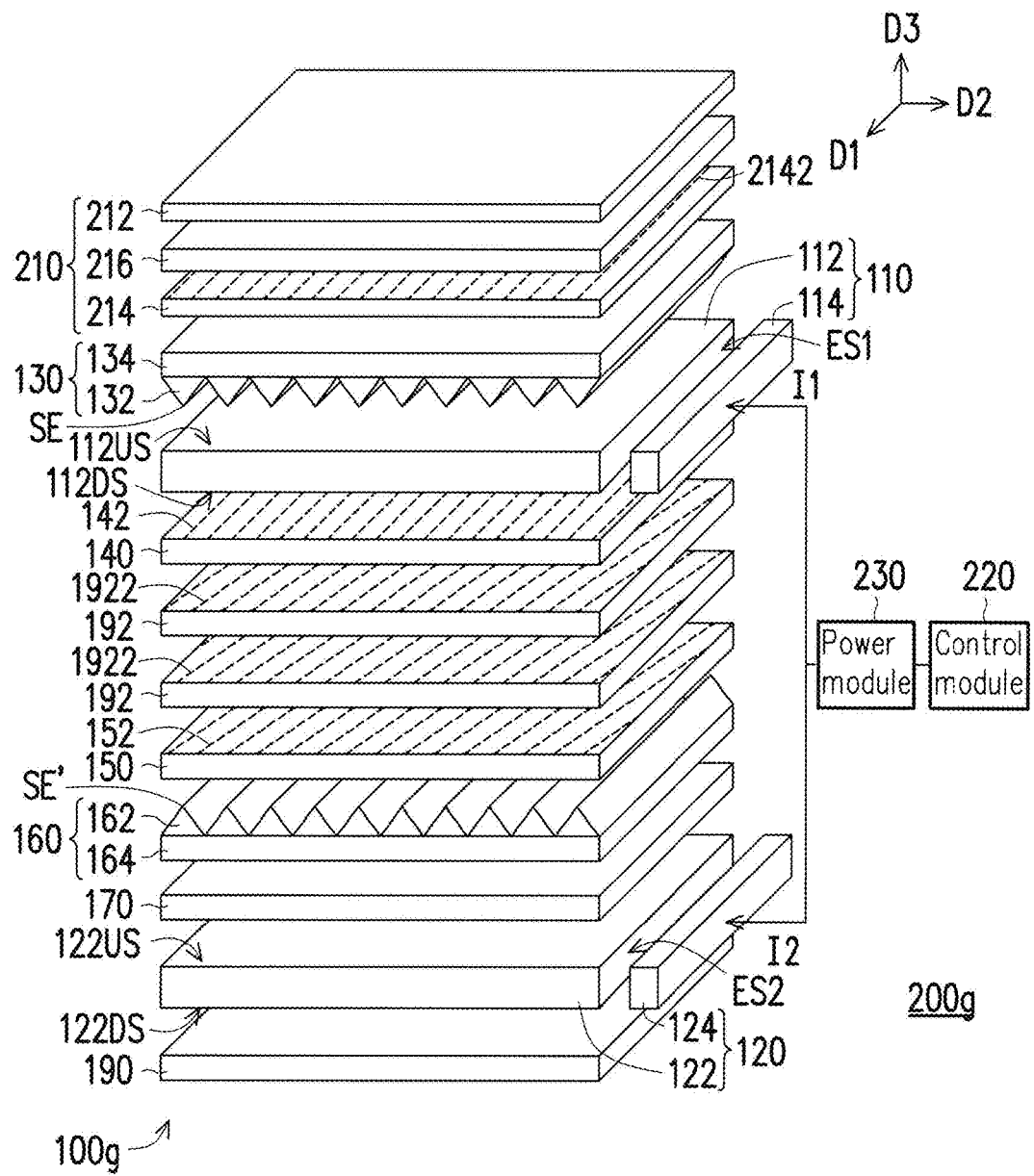
FIG. 10B is an explosive view illustrating the display device depicted in FIG. 10A.

FIG. 10A is a schematic cross-sectional view illustrating a display device according to another embodiment of the invention. FIG. 10B is an explosive view illustrating the display device depicted in FIG. 10A.

With reference to FIG. 10A and FIG. 10B, the display device 200g provided in the present embodiment is similar to the display device 200f depicted in FIG. 9A and FIG. 9B, and one of the differences lies in that the light source module 100g provided herein further includes a reflective polarizer film 150 and a reflector film 190. The reflective polarizer film 150 is located between the second absorptive polarizers 192 and the prism film 160. The reflective polarizer film 150 has a third polarizing transmission axis 152. An axial direction of the third polarizing transmission axis 152 is substantially parallel to the axial direction of the fourth polarizing transmission axes 1922. In the present embodiment, the included angle between the axial directions of the third polarizing transmission axis 152 and the fourth polarizing transmission axes 1922 respectively and the axial direction of the first polarizing transmission axis 142 are substantially greater than or equal to 0 degree and less than 90 degrees, and so is the included angle between the axial direction of the third polarizing transmission axis 152 and the axial direction of the first polarizing transmission axis 142. Preferably, said included angle is substantially 20 degrees, for instance.

Figure 11A:
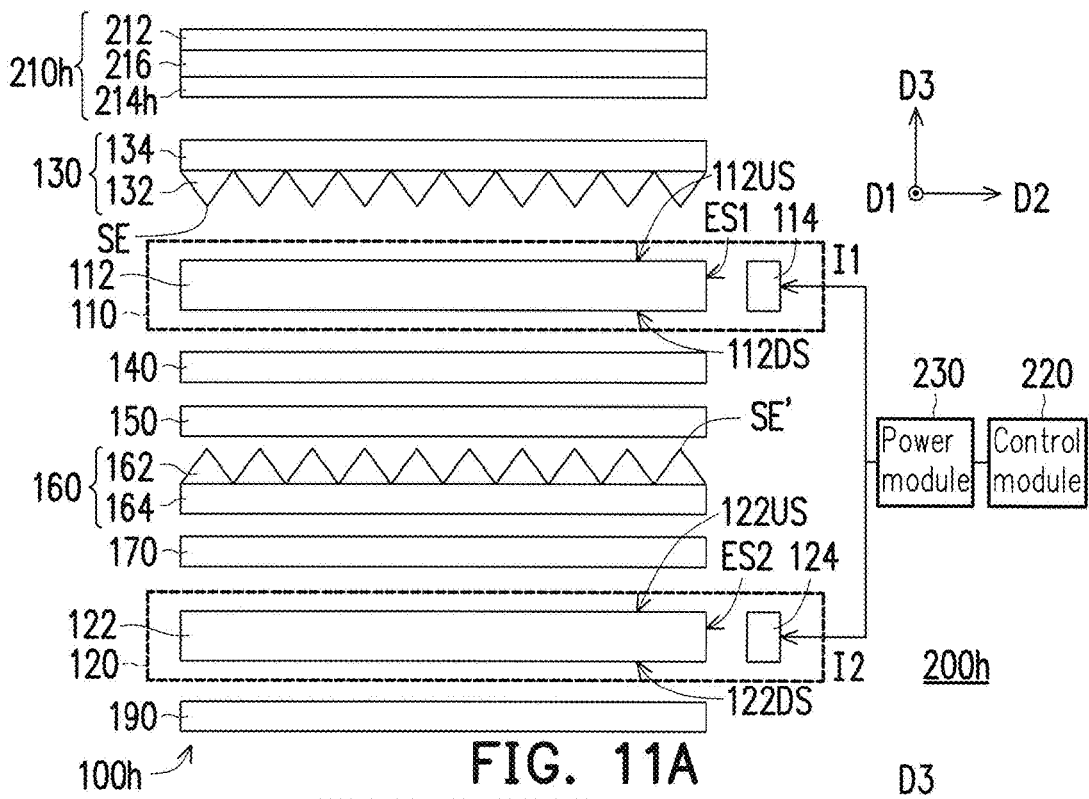
FIG. 11A is a schematic cross-sectional view ng a display device according to another embodiment of the invention.
Figure 11B:
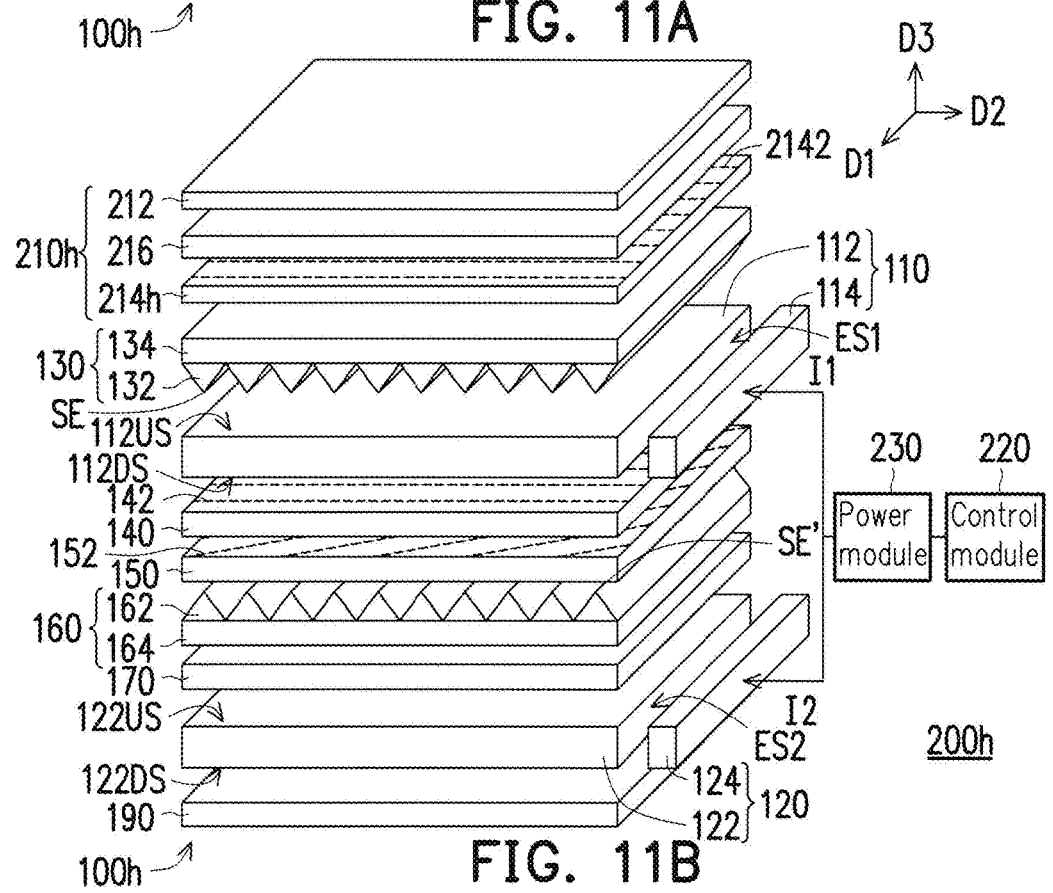
FIG. 11B is an explosive view illustrating the display device depicted in FIG. 11A.

FIG. 11A is a schematic cross-sectional view illustrating a display device according to another embodiment of the invention. FIG. 11B is an explosive view illustrating the display device depicted in FIG. 11A.

With reference to FIG. 11A and FIG. 11B, the display device 200h provided in the present embodiment is similar to the display device 200d depicted in FIG. 7A and FIG. 7B, and one of the differences lies in that the light source module 100h provided herein further includes a reflective polarizer film 150 and a reflector film 190. The reflective polarizer film 150 is located between the prism film 160 and the first absorptive polarizing film 140. The reflective polarizer film 150 has a third polarizing transmission axis 152. The included angle between the axial direction of the second polarizing transmission axis 2142 and the axial direction of the first polarizing transmission axis 142 is substantially 0 degree (e.g., both axes are extended along the second direction D2), and the extension direction of the reverse prisms 132 (i.e., the first direction D1) is substantially perpendicular to the axial direction of the second polarizing transmission axis 2142. In some embodiments of the invention, the included angle between the axial direction of the third polarizing transmission axis 152 and the axial direction of the first polarizing transmission axis 142 is substantially greater than or equal to 0 degree and less than 90 degrees. In FIG. 11A and FIG. 11B, preferably, the included angle is substantially 20 degrees, and the second backlight module 120 is located between the diffuser film 170 and the reflector film 190.

Figure 12A:
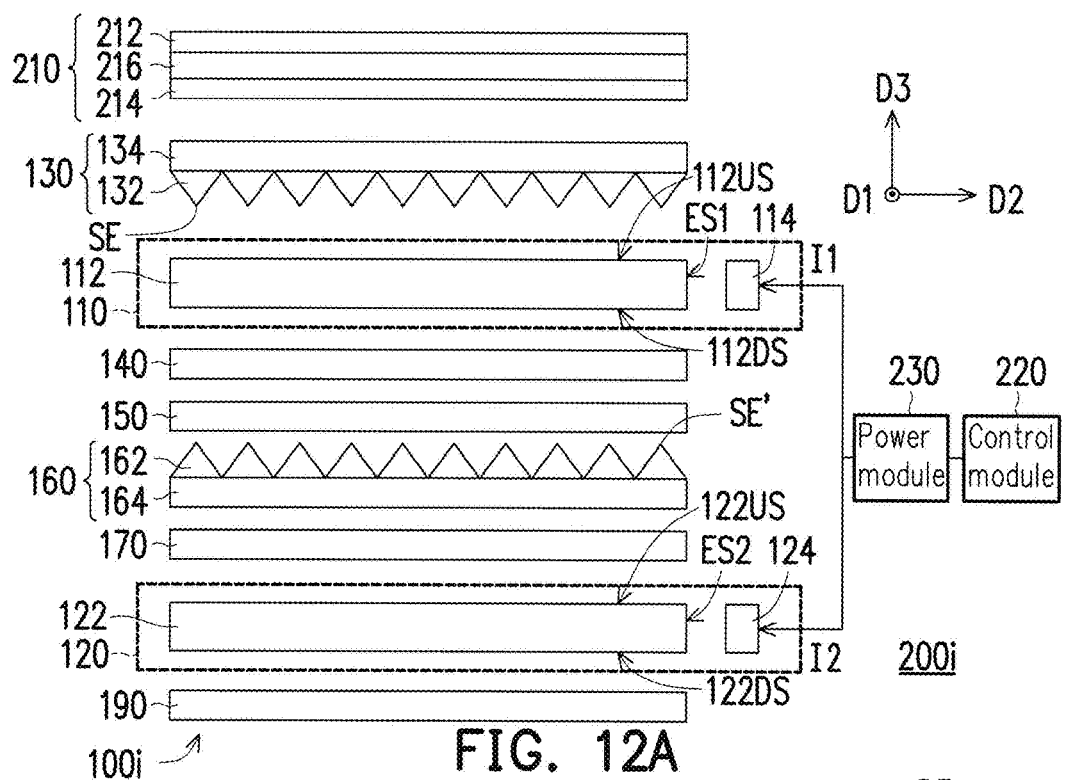
FIG. 12A is a schematic cross-sectional view illustrating a display device according to another embodiment of the invention.
Figure 12B:
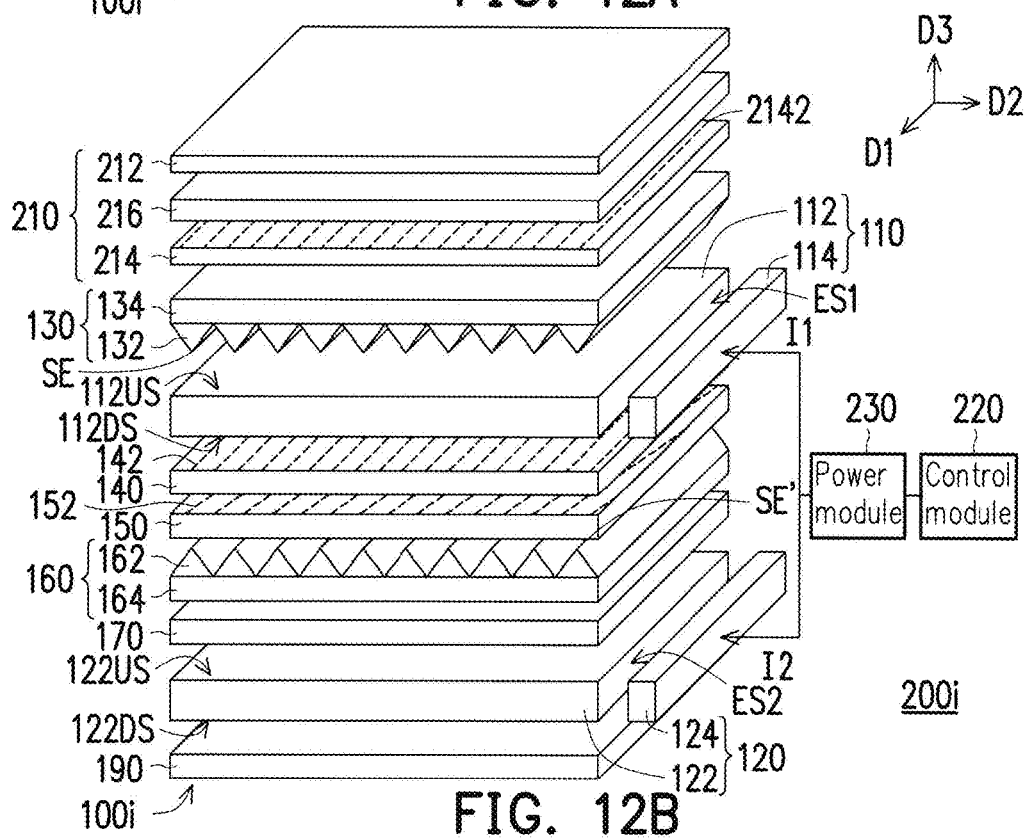
FIG. 12B is an explosive view illustrating the display device depicted in FIG. 12A.

FIG. 12A is a schematic cross-sectional view illustrating a display device according to another embodiment of the invention. FIG. 12B is an explosive view illustrating the display device depicted in FIG. 12A.

With reference to FIG. 12A and FIG. 12B, the display device 200i provided in the present embodiment is similar to the display device 200h depicted in FIG. 11A and FIG. 11B, and one of the differences lies in that the included angle between the axial direction of the second polarizing transmission axis 2142 and the axial direction of the first polarizing transmission axis 142 is substantially 0 degree (e.g., both axes are extended along the first direction D1), and the extension direction of the reverse prisms 132 (i.e., the first direction D1) is substantially perpendicular to the axial direction of the second polarizing transmission axis 2142. The reflective polarizer film 150 has a third polarizing transmission axis 152. In some embodiments of the invention, the included angle between the axial direction of the third polarizing transmission axis 152 and the axial direction of the first polarizing transmission axis 142 is substantially greater than or equal to 0 degree and less than 90 degrees. In FIG. 12A and FIG. 12B, preferably, the included angle is substantially 20 degrees.

Figure 13A:
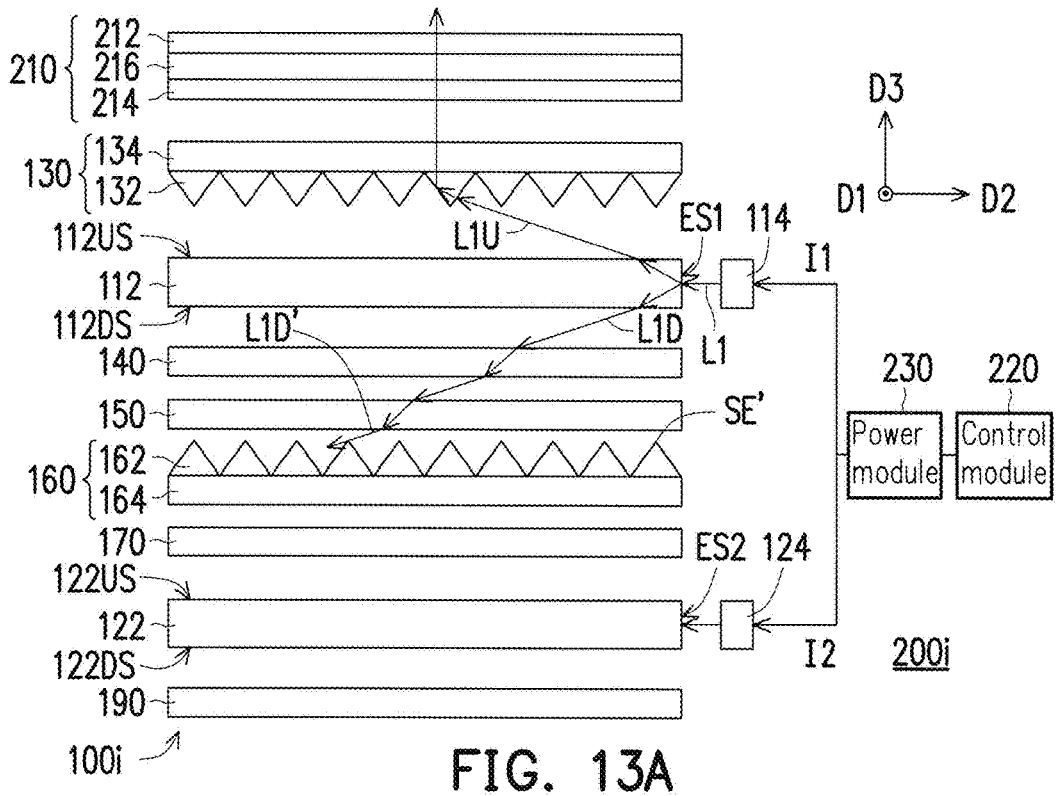
FIG. 13A and FIG. 13B are schematic views illustrating a light path according to the embodiment shown in FIG. 12A and FIG. 12B.
Figure 13B:
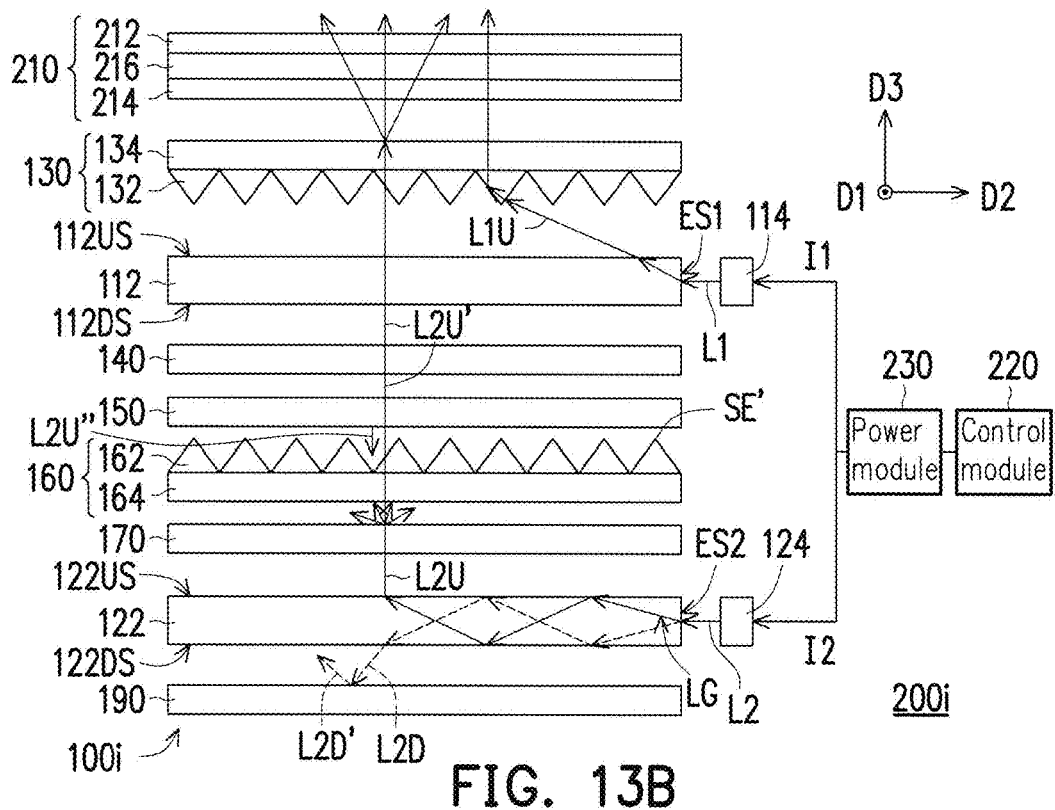
Figure 13C:
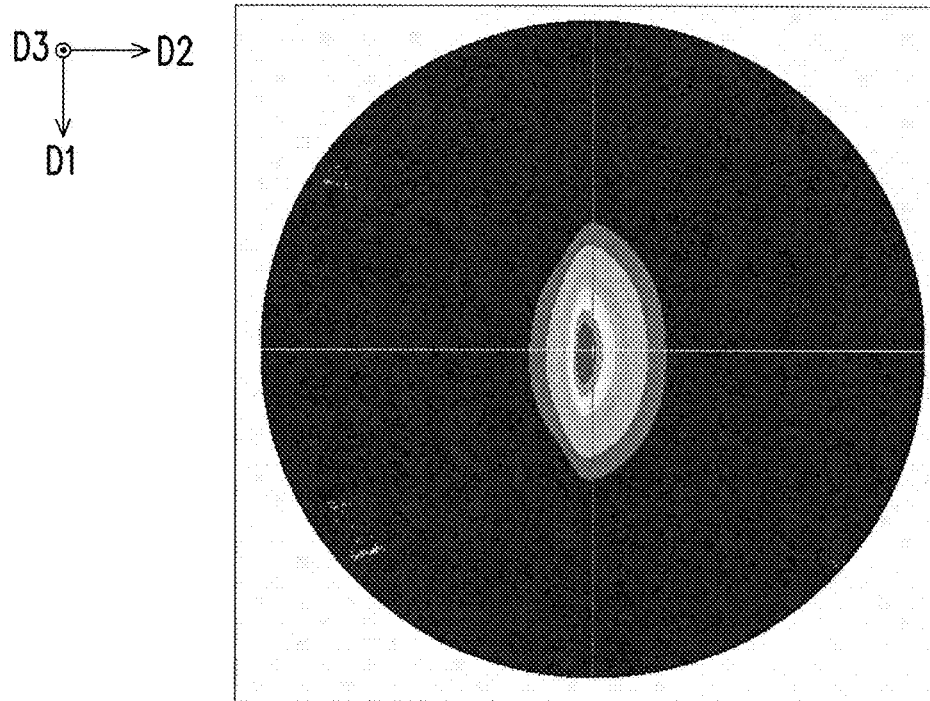
FIG. 13C illustrates optical simulation results in the narrow-view-angle display mode in the display device provided in the embodiment shown in FIG. 12A and FIG. 12B.
Figure 13D:
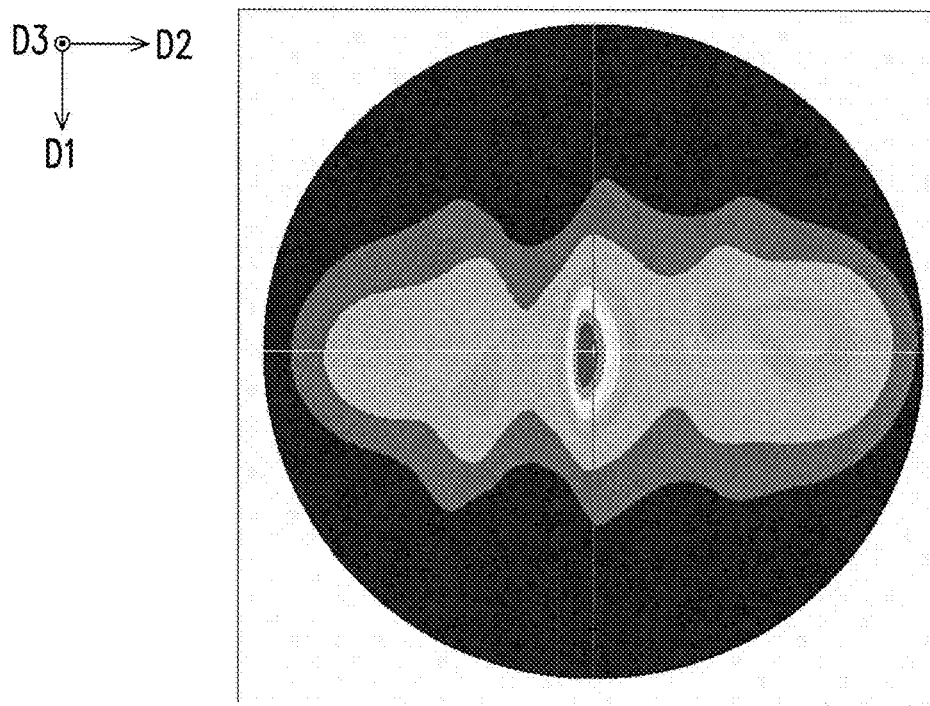
FIG. 13D illustrates optical simulation results in the wide-view-angle display mode in the display device provided in the embodiment shown in FIG. 12A and FIG. 12B.

FIG. 13A and FIG. 13B are schematic views illustrating a light path according to the embodiment shown in FIG. 12A and FIG. 12B. FIG. 13C illustrates optical simulation results in the narrow-view-angle display mode in the display device provided in the embodiment shown in FIG. 12A and FIG. 12B. FIG. 13D illustrates optical simulation results in the wide-view-angle display mode in the display device provided in the embodiment shown in FIG. 12A and FIG. 12B.

FIG. 13A and FIG. 13B are similar to FIG. 2A and FIG. 2B. Specifically, FIG. 13A is similar to FIG. 2A and thus will not be further explained. The difference between FIG. 13B and FIG. 2A and FIG. 2B lies in that the second light L2U emitted from the upper surface 122US of the second LGP 122 sequentially passes through the diffuser film 170, the prism film 160, and the reflective polarizer film 150. The diffuser film 170 is configured to diffuse the second light L2U emitted from the upper surface 122US of the second LGP 122, such that uniformity of the planar light source (generated by the second light L2U) can be improved. The prism film 160 is configured to converge the light emitting angle of the diffused second light L2U in the second direction D2, so as to improve the directivity of the second light L2U. Thereby, the amount of the second light L2U entering the first absorptive polarizer film 140 is relatively large, such that the light utilization efficiency of the second backlight module 120 can be increased. Thereby, in the converged second light L2U, a portion of the second light L2U (i.e., the second light L2U') with the polarization direction substantially parallel to the polarization direction of the third polarizing transmission axis 152 passes through the reflective polarizer film 150, and the other portion of the second light L2U (not shown) with the polarization direction substantially perpendicular to the polarization direction of the third polarizing transmission axis 152 is reflected by the reflective polarizer film 150 and recycled by the prism film 160, the diffuser film 170, the second LGP 122, and the reflector film 190. The recycled second light (not shown) again enters the reflective polarizer film 150. As a result, the light utilization efficiency of the second backlight module 120 in the display device 200i provided herein can be further improved.

With reference to FIG. 13B, the arrangement of the reflector film 190 allows a portion of the second light L2 (i.e., the second light L2D) emitted from the lower surface 122DS of the second LGP 122 to be reflected by the reflector film 190, and the reflected second light L2D' enters the second backlight module 120, so as to enhance the light utilization efficiency of the second backlight module 120.

With reference to FIG. 13C, in the narrow-view-angle display mode, the display device 200i provided in the present embodiment has the narrow view angle in the second direction D2 (i.e., the horizontal direction), and the view angle is substantially ±8 degrees, for instance. Hence, the display device 200i achieves the narrow-view-angle display effects.

With reference to FIG. 13D, in the wide-view-angle display mode, the display device 200i provided in the present embodiment has the wide view angle in the second direction D2 (i.e., the horizontal direction). Hence, the display device 200i achieves the wide-view-angle display effects.

Table 1 below is a comparison table recording optical experimental results when the display device 200h depicted in FIG. 11A and FIG. 11B and the display device 200i depicted in FIG. 12A and FIG. 12B are in the narrow-view-angle display mode.

TABLE 1

|  | Display device 200h | Display device 200i |
| --- | --- | --- |
| The axial direction of the second polarizing transmission axis 2142 | The second direction D2 | The first direction D1 |
| The extension direction of the reverse prisms 132 | The first direction D1 | The first direction D1 |
| The axial direction of the first polarizing transmission axis 142 | The second direction D2 | The first direction D1 |
| The axial direction of the third polarizing transmission axis 152 | A direction (an included | A direction (an included |

TABLE 1-continued

|  |  | Display device 200h angle between which and the second direction D2 is 20 degrees | Display device 200i angle between which and the first direction D1 is 20 degrees |
|---|---|---|---|
| Normalized luminance in the second direction D2 at different view angles | −45 degrees | 2.3% | 2.2% |
|  | 0 degree | 96.2% | 97.3% |
|  | 45 degrees | 1.6% | 1.6% |
| Normalized luminance at a forward angle (nit) |  | 90% | 100% |

It can be learned from Table 1 that the display device 200i depicted in FIG. 12A and FIG. 12B achieves better performance in the narrow-view-angle display mode, and the brightness is greater when the display device 200i is at the normal angle.

To sum up, the display device and the light source module provided herein may achieve at least one of advantages or effects as listed below. The design of the light source module provided in an embodiment of the invention allows the included angle between the axial direction of the first polarizing transmission axis of the first absorptive polarizer film and the axial direction of the second polarizing transmission axis of the second polarizer film to substantially fall within the range from 0 degree to 60 degrees. Hence, in different view angle display modes (e.g., the narrow-view-angle display mode or the wide-view-angle display mode), the light emitting efficacy of the light source module provided herein is relatively unlikely to be affected by stray light, and thus the favorable light emitting quality can be guaranteed. Since the display device provided in the embodiments of the invention includes said light source module, the display device in different view angle display modes can have the favorable image quality.

To be specific, in response to different users' demands, the axial direction of the second polarizing transmission axis of the second polarizer film of the display panel in the display device provided herein is substantially perpendicular or parallel to the extension direction of the reverse prisms of the first turning film; hence, the view angle of the display device in the second direction (i.e., the horizontal direction) can be better converged, and the amount of light emitted at a large angle can be reduced. In addition, the axial direction of the second polarizing transmission axis of the second polarizer film of the display panel in the display device provided herein is substantially parallel to the extension direction of the reverse prisms of the first turning film; hence, the overall brightness of the emitted light can be further enhanced.

Moreover, the light source module provided herein may be equipped with different kinds of optical films, so as to optimize the optical properties of the display device provided herein. For instance, the light source module provided herein may be equipped with the reflective polarizer film, so as to further improve the light utilization efficiency of the second backlight module in the display device. Besides, the light source module provided herein may be equipped with the second absorptive polarizer films, so as to further lessen the impact of the stray light on the display device. The light source module provided herein may also be equipped with the prism film and the diffuser film or the second turning film and the diffuser film, so as to improve the uniformity of the planar light source generated by the second light in the display device and enhance the light utilization efficiency of the display device. Through various arrangements and combinations of different kinds of optical films, the display device provided herein in different view-display modes need not sacrifice the luminance, the image contrast, and the image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. These claims may refer to use "first", "second", etc. following with noun or element. Such terms should be understood as a nomenclature and should not be construed as giving the limitation on the number of the elements modified by such nomenclature unless specific number has been given. Moreover, no element and component in the present disclosure is intended to be dedicated to the public regardless of whether the element or component is explicitly recited in the following claims.

What is claimed is:

1. A display device comprising:
   a light source module comprising:
      a first backlight module having a first side and a second side opposite to each other, the first backlight module comprising:
         a first light guide plate having a first light incident surface; and
         a first light source disposed beside the first light incident surface;
      a second backlight module disposed at the second side of the first backlight module, the second backlight module comprising:
         a second light guide plate having a second light incident surface; and
         a second light source disposed beside the second light incident surface;

a first turning film disposed at the first side of the first backlight module, the first turning film comprising a plurality of reverse prisms extending along an extension direction;

a first absorptive polarizer film disposed between the first backlight module and the second backlight module, the first absorptive polarizer film having a first polarizing transmission axis; and one or more second absorptive polarizer films located between the first absorptive polarizer film and the second backlight module, each of the second absorptive polarizer films has a fourth polarizing transmission axis, wherein an axial direction of the fourth polarizing transmission axis of the second absorptive polarizer film is different from an axial direction of the first polarizing transmission axis of the first absorptive polarizer film; and a display panel located at one side of the light source module; the display panel comprising:

a first polarizer film;

a second polarizer film having a second polarizing transmission axis; and a liquid crystal layer disposed between the first polarizer film and the second polarizer film, wherein the second polarizer film is located between the liquid crystal layer and the first turning film of the light source module, and an included angle between an axial direction of the first polarizing transmission axis and an axial direction of the second polarizing transmission axis substantially falls within a range from 0 degree to 60 degrees.

2. The display device according to claim 1, wherein the included angle between the axial direction of the first polarizing transmission axis and the axial direction of the second polarizing transmission axis is substantially 0 degree, and the axial direction of the second polarizing transmission axis is substantially perpendicular to the extension direction of the reverse prisms.

3. The display device according to claim 1, wherein the included angle between the axial direction of the first polarizing transmission axis and the axial direction of the second polarizing transmission axis is substantially 0 degree, and the axial direction of the second polarizing transmission axis is substantially parallel to the extension direction of the reverse prisms.

4. The display device according to claim 1, wherein the light source module further comprises a reflective polarizer film disposed between the first absorptive polarizer film and the second backlight module, the reflective polarizer film has a third polarizing transmission axis, and an included angle between an axial direction of the third polarizing transmission axis and the axial direction of the first polarizing transmission axis is substantially greater than or equal to 0 degree and less than 90 degrees.

5. The display device according to claim 1, wherein the light source module further comprises a prism film and a diffuser film, the prism film and the diffuser film are located between the first absorptive polarizer film and the second backlight module, and the diffuser film is located between the prism film and the second backlight module.

6. The display device according to claim 1, wherein the light source module further comprises a second turning film and a diffuser film, the second turning film and the diffuser film are located between the first absorptive polarizer film and the second backlight module, and the second turning film is located between the diffuser film and the second backlight module.

7. The display device according to claim 1, wherein an included angle between an axial direction of the fourth polarizing transmission axes and the axial direction of the first polarizing transmission axis is substantially greater than or equal to 0 degree and less than 90 degrees.

8. The display device according to claim 7, wherein the light source module further comprises a reflective polarizer film disposed between the second absorptive polarizer films and the second backlight module, the reflective polarizer film has a third polarizing transmission axis, the axial direction of the first polarizing transmission axis of the first absorptive polarizer film is substantially parallel to the axial direction of the second polarizing transmission axis of the second polarizer film, and an axial direction of the third polarizing transmission axis of the reflective polarizer film is substantially parallel to the axial direction of the fourth polarizing transmission axes of the second absorptive polarizer film.

9. The display device according to claim 1, further comprising:

a control module; and a power module coupled to the first light source of the first backlight module and the second light source of the second backlight module and configured to provide the first light source with a first driving current and the second light source with a second driving current, the control module being coupled to the power module and configured to control at least one of the first driving current and the second driving current.

10. A light source module comprising:

a first backlight module having a first side and a second side opposite to each other, the first backlight module comprising:

a first light guide plate having a first light incident surface; and a first light source disposed beside the first light incident surface;

a second backlight module disposed at the second side of the first backlight module, the second backlight module comprising:

a second light guide plate having a second light incident surface; and a second light source disposed beside the second light incident surface;

a first turning film disposed at the first side of the first backlight module, the first turning film comprising a plurality of reverse prisms extending along an extension direction;

a first absorptive polarizer film disposed between the first backlight module and the second backlight module, the first absorptive polarizer film having a first polarizing transmission axis; and one or more second absorptive polarizer films located between the first absorptive polarizer film and the second backlight module, each of the second absorptive polarizer films has a fourth polarizing transmission axis, wherein an axial direction of the fourth polarizing transmission axis of the second absorptive polarizer film is different from an axial direction of the first polarizing transmission axis of the first absorptive polarizer film.

11. The light source module according to claim 10, wherein the light source module further comprises a reflective polarizer film disposed between the first absorptive polarizer film and the second backlight module, the reflective polarizer film has a third polarizing transmission axis, and an included angle between an axial direction of the third polarizing transmission axis and the axial direction of the first polarizing transmission axis is substantially greater than or equal to 0 degree and less than 90 degrees.

12. The light source module according to claim 10, wherein the light source module further comprises a prism film and a diffuser film, the prism film and the diffuser film are located between the first absorptive polarizer film and the second backlight module, and the diffuser film is located between the prism film and the second backlight module.

13. The light source module according to claim 10, wherein the light source module further comprises a second turning film and a diffuser film, the second turning film and the diffuser film are located between the first absorptive polarizer film and the second backlight module, and the second turning film is located between the diffuser film and the second backlight module.

14. The light source module according to claim 10, wherein an included angle between an axial direction of the fourth polarizing transmission axes and the axial direction of the first polarizing transmission axis is substantially greater than or equal to 0 degree and less than 90 degrees.

15. The light source module according to claim 14, wherein the light source module further comprises a reflective polarizer film located between the second absorptive polarizer films and the second backlight module, the reflective polarizer film has a third polarizing transmission axis, and an axial direction of the third polarizing transmission axis of the reflective polarizer film is substantially parallel to the axial direction of the fourth polarizing transmission axes of the second absorptive polarizer films.

* * * * *